United States Patent
Gotou et al.

(10) Patent No.: US 12,351,732 B2
(45) Date of Patent: Jul. 8, 2025

(54) WATER REPELLENT AGENT COMPOSITION, AND PRODUCTION METHOD OF WATER REPELLENT FIBER PRODUCT

(71) Applicants: NICCA CHEMICAL CO., LTD., Fukui (JP); DOW TORAY CO., LTD., Tokyo (JP)

(72) Inventors: Akihiro Gotou, Fukui (JP); Kousuke Maeda, Fukui (JP); Yoshiki Tsuge, Fukui (JP); Kazuhiko Kojima, Ichihara (JP); Seiji Hori, Ichihara (JP)

(73) Assignees: NICCA CHEMICAL CO., LTD., Fukui (JP); DOW TORAY CO., LTD., Tokyo (JP)

( * ) Notice: Subject to any disclaimer, the term of this patent is extended or adjusted under 35 U.S.C. 154(b) by 265 days.

(21) Appl. No.: 16/956,696

(22) PCT Filed: Dec. 20, 2018

(86) PCT No.: PCT/JP2018/047085
§ 371 (c)(1),
(2) Date: Jun. 22, 2020

(87) PCT Pub. No.: WO2019/131456
PCT Pub. Date: Jul. 4, 2019

(65) Prior Publication Data
US 2020/0332148 A1 Oct. 22, 2020

(30) Foreign Application Priority Data
Dec. 25, 2017 (JP) .................. 2017-247815

(51) Int. Cl.
*C09D 183/04* (2006.01)
*C09D 5/00* (2006.01)
*D06M 13/513* (2006.01)
*D06M 15/643* (2006.01)
*D06M 101/32* (2006.01)
*D06M 101/34* (2006.01)

(52) U.S. Cl.
CPC ............ *C09D 183/04* (2013.01); *C09D 5/00* (2013.01); *D06M 13/513* (2013.01); *D06M 15/643* (2013.01); *D06M 2101/32* (2013.01); *D06M 2101/34* (2013.01); *D06M 2200/12* (2013.01)

(58) Field of Classification Search
CPC ..... C09D 183/04; C09D 5/00; D06M 13/513; D06M 15/643; D06M 2101/32; D06M 2101/34; D06M 2200/12
See application file for complete search history.

(56) References Cited

U.S. PATENT DOCUMENTS

| | | | |
|---|---|---|---|
| 4,436,856 A | 3/1984 | Huhn et al. | |
| 6,309,984 B1 * | 10/2001 | Nonaka | D06M 15/643 442/79 |
| 2010/0292389 A1 * | 11/2010 | McAuliffe | C04B 41/009 524/500 |
| 2015/0336371 A1 * | 11/2015 | Yawata | B05D 1/18 427/512 |

FOREIGN PATENT DOCUMENTS

| | | | | |
|---|---|---|---|---|
| CN | 1275650 A | 12/2000 | | |
| EP | 1 057 924 A2 | 12/2000 | | |
| EP | 1273618 A1 * | 1/2003 | | C08L 83/14 |
| JP | S57-149563 A | 9/1982 | | |
| JP | 2000-336580 A | 12/2000 | | |
| JP | 2004-059609 A | 2/2004 | | |
| JP | 2004324012 A * | 11/2004 | | |
| JP | 2006-328624 A | 12/2006 | | |
| JP | 2010-526891 A | 8/2010 | | |
| WO | WO-03106758 A2 * | 12/2003 | | C03C 25/40 |
| WO | WO 2008/134243 A1 | 11/2008 | | |

OTHER PUBLICATIONS

English translation of Dumont et al. WO 03-106758.*
English translation of JP2004-324012.*
International Bureau, International Search Report in International Application No. PCT/JP2018/047085, mailed Apr. 2, 2019.
International Bureau, International Preliminary Report on Patentability and Written Opinion in International Application No. PCT/JP2018/047085, mailed Jun. 30, 2020.
European Patent Office, Extended European Search Report in counterpart European Patent Application No. 18895048.9, mailed on Aug. 25, 2021.
European Patent Office, Office Action issued in European Patent Application No. 18 895 048.9, dated Nov. 28, 2024.
"Shin-Etsu, ""KF-7312K""", Retrieved from the Internet: URL:https://www.shinetsusilicone-global.com/products/personalcare/pdf/KF/KF-7312K.pdf, Nov. 9, 2020, p. 1-p. 2, XP093226386".
"Silicones", Encyclopedia of Polymer Science and Technology, Wiley, US, Apr. 15, 2003, p. 765-p. 841, XP007918236.

* cited by examiner

*Primary Examiner* — Robert S Walters, Jr.
(74) *Attorney, Agent, or Firm* — Leydig, Voit & Mayer, Ltd.

(57) ABSTRACT

A water repellent agent composition contains amino-modified silicone, a silicone resin, and alkylpolysiloxane. An amount of the alkylpolysiloxane mixed is 500 to 15,000 parts by mass with respect to 100 parts by mass of an amount of the amino-modified silicone mixed. A method for producing a water-repellent textile product includes a step of treating fibers with a treatment liquid including the water repellent agent composition.

3 Claims, No Drawings

WATER REPELLENT AGENT COMPOSITION, AND PRODUCTION METHOD OF WATER REPELLENT FIBER PRODUCT

CROSS-REFERENCE TO RELATED APPLICATIONS

This patent application is the U.S. National Stage of International Patent Application No. PCT/JP2018/047085, filed Dec. 20, 2018, which claims the benefit of Japanese Patent Application No. 2017-247815, filed Dec. 25, 2017, which are each incorporated by reference.

TECHNICAL FIELD

The present invention relates to a water repellent agent composition and a method for producing a water-repellent textile product.

BACKGROUND ART

Fluorinated water repellent agents having fluorine groups are conventionally known, and textile products imparted with water repellency on the surface, which are produced by treating textile products or the like with such fluorinated water repellent agents, are known. Such fluorinated water repellent agents are generally produced by polymerizing or copolymerizing a monomer having a fluoroalkyl group. Textile products that have been treated with fluorinated water repellent agents exhibit excellent water repellency; however, monomers having fluoroalkyl groups have an environmental problem since the monomers are low degradability.

Thus, in recent years, research on non-fluorinated water repellent agents that do not contain fluorine is underway. For example, Patent Literature 1 described below proposes a water repellent agent composed of a specific non-fluorinated polymer containing, as a monomer unit, a (meth)acrylic acid ester having 12 or more carbon atoms in the ester moiety. Furthermore, Patent Literature 2 described below proposes a soft water repellent agent containing amino-modified silicone and a polyfunctional isocyanate compound.

CITATION LIST

Patent Literature

Patent Literature 1: Japanese Unexamined Patent Publication No. 2006-328624
Patent Literature 2: Japanese Unexamined Patent Publication No. 2004-059609

SUMMARY OF INVENTION

Technical Problem

From the practical aspect, there is a demand for further enhancing the water repellency of the non-fluorinated water repellent agent without the texture of the textile product being impaired. Therefore, there is also need for improvement in the water repellent agent described in Patent Literature 1 described above.

In regard to the silicone-based soft water repellent agent described in Patent Literature 2 described above, satisfactory texture is obtainable; however, there are problems in that sufficient water repellency performance is difficult to obtain, initial water repellency and durable water repellency that the water repellency can be sufficiently maintained particularly even after washing are difficult to obtain.

The present invention was achieved in view of such circumstances as described above, and an object thereof is to provide a water repellent agent composition by which a water-repellent textile product excellent in water repellency, durable water repellency, and texture can be obtained, and a method for producing a water-repellent textile product using the same.

Solution to Problem

The present inventors have conducted intensive studies in order to solve the above-described problems, and as a result, the present inventors have found that, by combining a specific silicone compound, a silicone resin, and alkylpolysiloxane and adjusting a mass ratio of an amount of the specific silicone compound mixed and an amount of the alkylpolysiloxane mixed, it is possible to obtain a textile product exhibiting water repellency and durable water repellency at a high level and having soft texture, thereby completing the present invention on the basis of that finding.

The present invention provides a first water repellent agent composition containing amino-modified silicone, a silicone resin, and alkylpolysiloxane, in which an amount of the alkylpolysiloxane mixed is 500 to 15,000 parts by mass with respect to 100 parts by mass of an amount of the amino-modified silicone mixed.

According to the first water repellent agent composition related to the present invention, it is possible to obtain a water-repellent textile product excellent in water repellency, durable water repellency, and texture. Furthermore, according to the first water repellent agent composition related to the present invention, it is possible to obtain a water-repellent textile product also excellent in seam slippage property that corresponds to performance of preventing a phenomenon in which a seam is opened during wearing. The reason for obtaining such an effect is considered that, by combining the above-described components at a predetermined mixed amount, water repellency and durable water repellency can be enhanced without the texture of fibers being impaired, and fibers can be inhibited from stretching too much or getting hard too much.

From the viewpoints of water repellency, durable water repellency, texture, and seam slippage property, a functional group equivalent of the amino-modified silicone may be 100 to 20,000 g/mol. Herein, the functional group equivalent of the amino-modified silicone means the molecular weight of the amino-modified silicone per 1 mol of nitrogen atom.

The present invention also provides a second water repellent agent composition containing dimethylpolysiloxane having a hydroxyl group and/or an alkoxy group having 1 to 3 carbon atoms, an amino group-containing silane coupling agent, a silicone resin, and alkylpolysiloxane, in which an amount of the alkylpolysiloxane mixed is 500 to 15,000 parts by mass with respect to 100 parts by mass of the total amount of the dimethylpolysiloxane and the amino group-containing silane coupling agent mixed.

According to the second water repellent agent composition related to the present invention, it is possible to realize a water-repellent textile product excellent in water repellency, durable water repellency, and texture. Furthermore, also, according to the second water repellent agent composition related to the present invention, it is possible to obtain a water-repellent textile product also excellent in seam slippage property.

The present invention further provides a method for producing a water-repellent textile product, the method including a step of treating fibers with a treatment liquid including the first or second water repellent agent composition according to the present invention.

According to the method for producing a water-repellent textile product of the present invention, it is possible to stably produce a water-repellent textile product excellent in water repellency, durable water repellency, and texture. Furthermore, a water-repellent textile product produced by the method of the present invention may be excellent in seam slippage property.

Advantageous Effects of Invention

According to the present invention, it is possible to provide a water repellent agent composition by which a water-repellent textile product excellent in water repellency, durable water repellency, and texture can be obtained. Furthermore, according to the water repellent agent composition of the present invention, excellent seam slippage property can be imparted to a textile product or the like.

DESCRIPTION OF EMBODIMENTS

Hereinafter, suitable embodiments of the present invention will be described in detail. However, the present invention is not intended to be limited to the embodiments described below.

A water repellent agent composition of the present embodiment contains a water repellent component including amino-modified silicone (hereinafter, also referred to as a component (I) in some cases) and a silicone resin (hereinafter, also referred to as a component (II) in some cases) and alkylpolysiloxane (hereinafter, also referred to as a component (III) in some cases).

<Amino-Modified Silicone>

Examples of the amino-modified silicone include compounds having an organic group including an amino group and/or an imino group at a side chain or terminal of organopolysiloxane. Examples of such an organic group include an organic group represented by —R—NH$_2$ and an organic group represented by —R—NH—R'—NH$_2$. Examples of R and R' include divalent groups such as an ethylene group and a propylene group. The amino group and/or the imino group may be an amino group and/or an imino group in which a part or the whole thereof is capped. The capped amino group and/or imino group are obtainable, for example, by treating the amino group and/or the imino group with a capping agent. Examples of the capping agent include fatty acid having 2 to 22 carbon atoms, acid anhydride of fatty acid having 2 to 22 carbon atoms, acid halide of fatty acid having 2 to 22 carbon atoms, and aliphatic monoisocyanate having 1 to 22 carbon atoms.

A functional group equivalent of the amino-modified silicone is preferably 100 to 20,000 g/mol, more preferably 150 to 12,000 g/mol, and even more preferably 200 to 4,000 g/mol, from the viewpoints of water repellency, durable water repellency, texture, and seam slippage property.

The amino-modified silicone is preferably in a liquid form at 25° C. A kinetic viscosity at 25° C. of the amino-modified silicone is preferably 10 to 100,000 mm$^2$/s, more preferably 10 to 30,000 mm$^2$/s, and even more preferably 10 to 5,000 mm$^2$/s. In a case in which the kinetic viscosity at 25° C. is 100,000 mm$^2$/s or less, workability and seam slippage property tend to be easily secured. The kinetic viscosity at 25° C. means a value measured by the method described in JIS K 2283:2000 (Uberode-type viscometer).

As the amino-modified silicone, commercially available products can be used. Examples of the commercially available products include KF8005, KF-868, KF-864, and KF-393 (all manufactured by Shin-Etsu Chemical Co., Ltd., trade name), XF42-B1989 (manufactured by Momentive Performance Materials Japan LLC), and SF-8417 and BY16-853U (all manufactured by Dow Corning Toray Co., Ltd., trade name).

Regarding the amino-modified silicone, one kind may be used alone, or two or more kinds thereof may be used in combination.

As for the amino-modified silicone, a part or the whole of an amino group and/or an imino group may be neutralized, or the amino-modified silicone may be an unneutralized product. In neutralization, organic acids such as lactic acid, acetic acid, propionic acid, maleic acid, oxalic acid, formic acid, methanesulfonic acid, and toluenesulfonic acid; and inorganic acids such as hydrogen chloride, sulfuric acid, and nitric acid can be used.

The amount of the amino-modified silicone mixed in the water repellent agent composition of the present embodiment can be set to 0.01% to 1% by mass based on the total amount of the water repellent agent composition in a case in which the water repellent agent composition is used as a treatment bath (for example, a treatment bath for treating fibers). Furthermore, at the time of distribution, the amount of the amino-modified silicone mixed can be set to 0.1% to 50% by mass based on the total amount of the water repellent agent composition, and may be 0.2% to 20% by mass.

In the water repellent agent composition of the present embodiment, instead of the amino-modified silicone, dimethylpolysiloxane having a hydroxyl group and/or an alkoxy group having 1 to 3 carbon atoms at a terminal or side chain (hereinafter, also referred to as a component (IV) in some cases) and an amino group-containing silane coupling agent (hereinafter, also referred to as a component (V) in some cases) can be mixed. The water repellent agent composition in this case (hereinafter, also referred to as a second water repellent agent composition in some cases) is obtained by mixing at least the component (IV), the component (V), the component (II), and the component (II). The hydroxyl group and/or the alkoxy group having 1 to 3 carbon atoms in the component (V) is preferably bonded to a terminal of the dimethylpolysiloxane skeleton, and more preferably bonded to both terminals.

The kinetic viscosity at 25° C. of a reactant of the component (IV) and the component (V) is preferably 10 to 100,000 mm$^2$/s, more preferably 10 to 30,000 mm$^2$/s, and even more preferably 10 to 5,000 mm$^2$/s. In a case in which the kinetic viscosity at 25° C. is 100,000 mm$^2$/s or less, workability and seam slippage property tend to be easily secured. The kinetic viscosity at 25° C. means a value measured by the method described in JIS K 2283:2000 (Uberode-type viscometer).

Examples of the amino group-containing silane coupling agent include silane compounds having an amino group and an alkoxy group having 1 to 3 carbon atoms such as KBM-602 (N-2-(aminoethyl)-3-aminopropylmethyldimethoxysilane), KBM-603 (N-2-(aminoethyl)-3-aminopropyltrimethoxysilane), and KBM-903 (3-aminopropyltrimethoxysilane) manufactured by Shin-Etsu Chemical Co., Ltd.

The amount of the component (IV) and the component (V) mixed in the second water repellent agent composition can be set to 0.01% to 1% by mass in total based on the total amount of the water repellent agent composition in a case in which the water repellent agent composition is used as a treatment bath (for example, a treatment bath for treating fibers). Furthermore, at the time of distribution, the amount of the component (IV) and the component (V) mixed can be set to 0.1% to 50% by mass in total based on the total amount of the water repellent agent composition, and may be 0.2% to 20% by mass.

The mixing proportion of the component (IV) and the component (V) can be set to 20:1 to 1:1 in terms of the molar ratio [(IV):(V)] of the functional group of the component (IV) (sum of a hydroxyl group and an alkoxy group having 1 to 3 carbon atoms) to the functional group of the component (V) (sum of an alkoxy group having 1 to 3 carbon atoms).

<Silicone Resin>

The water repellent agent composition of the present embodiment contains a silicone resin as a silicone compound other than the amino-modified silicone, the component (IV), and the reactant of the component (IV) and the component (V). It is preferable that the silicone resin is organopolysiloxane containing MQ, MDQ, MT, MTQ, MDT, or MDTQ as a constituent, being a solid form at 25° C., and having a three-dimensional structure. Furthermore, the hardness of the silicone resin, which is measured by the Type A durometer according to JIS K 6249:2003 13. Hardness Test, is preferably 20 or more and more preferably 60 or more. Herein, M, D, T, and Q represent a $(R'')_3SiO_{0.5}$ unit, a $(R'')_2SiO$ unit, a $R''SiO_5$ unit, and a $SiO_2$ unit, respectively. R" represents a monovalent aliphatic hydrocarbon group having 1 to 10 carbon atoms or a monovalent aromatic hydrocarbon group having 6 to 15 carbon atoms.

The silicone resin is generally known as an MQ resin, an MT resin, or an MDT resin, and has a moiety shown by MDQ, MTQ, or MDTQ in some cases.

The silicone resin is also available as a solution obtained by dissolving the silicone resin in alkylpolysiloxane or an appropriate solvent other than alkylpolysiloxane. Examples of the solvent other than alkylpolysiloxane include n-hexane, isopropyl alcohol, methylene chloride, 1,1,1-trichloroethane, and a mixture of these solvents.

Examples of the solution obtained by dissolving the silicone resin in alkylpolysiloxane include KF7312J (mixture of trimethylsilyl group-containing polysiloxane:decamethyl cyclopentasiloxane=50:50), KF7312F (mixture of trimethylsilyl group-containing polysiloxane:octamethyl cyclotetrasiloxane=50:50), KF9021L (mixture of trimethylsilyl group-containing polysiloxane:low-viscosity methylpolysiloxane=50:50), and KF7312L (mixture of trimethylsilyl group-containing polysiloxane:low-viscosity methylpolysiloxane=50:50), which are commercially available from Shin-Etsu Chemical Co., Ltd.

Examples of the silicone resin alone include MQ-1600 solid Resin (trimethylsilyl group-containing polysiloxane) and MQ-1640 Flake Resin (trimethylsilyl group-containing polysiloxane, polypropylsilsesquioxane) commercially available from Dow Corning Toray Co., Ltd. The commercially available products contain trimethylsilyl group-containing polysiloxane and contain MQ, MDQ, MT, MTQ, MDT, or MDTQ.

The amount of the silicone resin mixed in the water repellent agent composition of the present embodiment can be set to 50 to 15,000 parts by mass and may be 100 to 10,000 parts by mass, 150 to 6,000 parts by mass, 500 to 15,000 parts by mass, or 900 to 6,000 parts by mass, with respect to 100 parts by mass of the amount of the amino-modified silicone mixed, from the viewpoints of water repellency, texture, and seam slippage property.

Furthermore, the amount of the silicone resin mixed in the second water repellent agent composition of the present embodiment is preferably 500 to 15,000 parts by mass and more preferably 900 to 6,000 parts by mass, with respect to 100 parts by mass of the total amount of the component (IV) and the component (V) mixed, from the viewpoints of water repellency, texture, and seam slippage property.

<Alkylpolysiloxane>

The alkylpolysiloxane is a compound in which a side chain and a terminal of chain-like organopolysiloxane are a saturated hydrocarbon group or a compound in which the side chain of cyclic organopolysiloxane is a saturated hydrocarbon group. Examples of the alkylpolysiloxane include a compound represented by General Formula (1) described below and a compound represented by General Formula (2) described below.

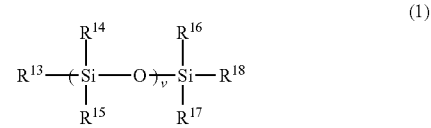

(1)

wherein in Formula (1), $R^{13}$, $R^{14}$, $R^{15}$, $R^{16}$, $R^{17}$, and $R^{18}$ each independently represent a monovalent saturated hydrocarbon group having 1 to 18 carbon atoms, and v represents an integer of 1 or larger.

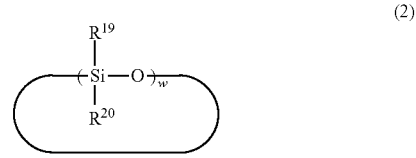

(2)

wherein in Formula (2), $R^{19}$ and $R^{20}$ each independently represent a monovalent saturated hydrocarbon group having 1 to 18 carbon atoms, and w represents an integer from 2 to 20.

In the compound represented by General Formula (1) described above which is used for the present embodiment, $R^{13}$, $R^{14}$, $R^{15}$, $R^{16}$, $R^{17}$, and $R^{18}$ each independently represent a monovalent saturated hydrocarbon group having 1 to 18 carbon atoms. The number of carbon atoms of the saturated hydrocarbon group is preferably 1 to 10, from the viewpoints that the silicone resin is easily dissolved in the compound represented by General Formula (1) and the compound is easily available. The saturated hydrocarbon group may be linear or branched. The saturated hydrocarbon group is preferably linear and more preferably a linear alkyl group. The saturated hydrocarbon group is preferably a methyl group or an ethyl group, and more preferably a methyl group. v represents an integer of 1 or larger. v can be selected as appropriate such that the kinetic viscosity of the compound represented by General Formula (1) is in the range of the kinetic viscosity of the alkylpolysiloxane described below.

Examples of the compound represented by General Formula (1) described above include dimethylpolysiloxane and diethylpolysiloxane.

In the compound represented by General Formula (2) described above which is used for the present embodiment, $R^{19}$ and $R^{20}$ each independently represent a monovalent saturated hydrocarbon group having 1 to 18 carbon atoms. The number of carbon atoms of this saturated hydrocarbon group is preferably 1 to 10. In a case in which the number of carbon atoms of the saturated hydrocarbon group is within the range described above, there is a tendency that the silicone resin is easily dissolved in the compound represented by General Formula (2) and the compound is easily available. The saturated hydrocarbon group may be linear or branched. The saturated hydrocarbon group is preferably linear and more preferably a linear alkyl group. The saturated hydrocarbon group is preferably a methyl group or an ethyl group, and more preferably a methyl group. w represents an integer from 2 to 20. w is preferably 3 to 10 and more preferably 4 or 5. In a case in which w is within the range described above, there is a tendency that the silicone resin is easily dissolved in the compound represented by General Formula (2) and the compound is easily available.

Examples of the compound represented by General Formula (2) described above include decamethyl cyclopentasiloxane and octamethyl cyclotetrasiloxane.

Regarding the alkylpolysiloxane, one kind may be used alone, or two or more kinds thereof may be used in combination.

The alkylpolysiloxane is preferably in a liquid form at 25° C. The kinetic viscosity at 25° C. of the alkylpolysiloxane is preferably 0.1 to 100,000 mm²/s, more preferably 0.1 to 10,000 mm²/s, further preferably 0.1 to 1,000 mm²/s, even more preferably 0.1 to 500 mm²/s, and particularly preferably 0.1 to 100 mm²/s. In a case in which the kinetic viscosity at 25° C. is within the range described above, the silicone resin is easily dissolved in the alkylpolysiloxane and workability is easy to secure. The kinetic viscosity at 25° C. means a value measured by the method described in JIS K 2283:2000 (Uberode-type viscometer).

The amount of the alkylpolysiloxane mixed in the water repellent agent composition of the present embodiment is 500 to 15,000 parts by mass with respect to 100 parts by mass of the amount of the amino-modified silicone mixed. The amount of the alkylpolysiloxane mixed is preferably 900 to 6,000 parts by mass with respect to 100 parts by mass of the amount of the amino-modified silicone mixed, from the viewpoints of water repellency, texture, and seam slippage property.

In addition, the amount of the alkylpolysiloxane mixed in the second water repellent agent composition of the present embodiment is 500 to 15,000 parts by mass with respect to 100 parts by mass of the total amount of the component (IV) and the component (V) mixed. The amount of the alkylpolysiloxane mixed is more preferably 900 to 6,000 parts by mass with respect to 100 parts by mass of the total amount of the component (IV) and the component (V) mixed, from the viewpoints of water repellency, texture, and seam slippage property. The mass ratio [(II):(III)] of the amount of the silicone resin mixed and the amount of the alkylpolysiloxane mixed in the water repellent agent composition of the present embodiment is preferably 10:90 to 60:40, more preferably 20:80 to 55:45, and even more preferably 20:80 to 35:65, from the viewpoints of texture and water repellency.

Examples of the water repellent component other than the component (I), the component (II), the component (IV), and the component (V) include conventionally known fluorine-based polymers, and hydrocarbon group-containing compounds such as aliphatic hydrocarbon, aliphatic carboxylic acid, and esters thereof, polyolefin, and poly(meth)acrylic acid ester.

Examples of the conventionally known fluorine-based polymers include NK GUARD S-33 (manufactured by NICCA CHEMICAL CO., LTD.).

Examples of the aliphatic hydrocarbon include paraffinic hydrocarbon and olefinic hydrocarbon. The number of carbon atoms of the aliphatic hydrocarbon is preferably 12 or more.

The aliphatic carboxylic acid may be saturated or unsaturated, and the number of carbon atoms is preferably 12 or more. Esters of such aliphatic carboxylic acid may be used.

Examples of the polyolefin include polyethylene, polypropylene, and an ethylene-propylene copolymer.

In regard to the poly(meth)acrylic acid ester, the number of carbon atoms of the hydrocarbon group existing via an ester bond is preferably 12 or more. Furthermore, the number of carbon atoms of the hydrocarbon group is preferably 24 or less. The hydrocarbon group may be linear or branched, may be saturated hydrocarbon or unsaturated hydrocarbon, and may have an alicyclic or aromatic cyclic form. Among these, it is preferable that the hydrocarbon group is linear, and it is more preferable that the hydrocarbon group is a linear alkyl group. The compositional proportion of the monomer of acrylic acid ester or methacrylic acid ester in such a polymer is preferably 80% to 100% by mass, with respect to the total amount of the monomer units that constitute the polymer. Furthermore, the weight average molecular weight of such a polymer is preferably 500,000 or more. Furthermore, a copolymer of acrylic acid ester and methacrylic acid ester may be used.

Examples of such poly(meth)acrylic acid ester (non-fluorinated polymer) include a non-fluorinated acrylic polymer containing a constituent unit derived from a (meth)acrylic acid ester monomer (A) represented by the following General Formula (A-1) (hereinafter, also referred to as "component (A)").

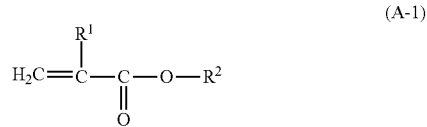

(A-1)

wherein in Formula (A-1), $R^1$ represents a hydrogen or a methyl group; and $R^2$ represents a monovalent hydrocarbon group having 12 or more carbon atoms which may have a substituent.

The (meth)acrylic acid ester monomer (A) represented by General Formula (A-1) described above, which is used for the present embodiment, has a monovalent hydrocarbon group having 12 or more carbon atoms which may have a substituent. This hydrocarbon group may be linear or branched, may be a saturated hydrocarbon group or an unsaturated hydrocarbon group, and may have an alicyclic or aromatic cyclic form. Among these, it is preferable that the hydrocarbon group is linear, and it is more preferable that the hydrocarbon group is a linear alkyl group. In this case, superior water repellency is obtained. In a case in which the monovalent hydrocarbon group having 12 or more carbon atoms has a substituent, the substituent may be one or more of a hydroxy group, an amino group, a carboxy group, an epoxy group, an isocyanate group, a blocked isocyanate group, a (meth)acryloyloxy group, and the like. In the present embodiment, it is preferable that $R^2$ in General Formula (A-1) described above is an unsubstituted hydrocarbon group.

The number of carbon atoms of the hydrocarbon group is preferably 12 to 24. If the number of carbon atoms is 12 or more, in a case in which the water repellent agent composition containing a non-fluorinated acrylic polymer is attached to a textile product or the like, water repellency is more easily enhanced. Meanwhile, if the number of carbon atoms is 24 or less, in a case in which the water repellent agent composition containing a non-fluorinated acrylic polymer is attached to a textile product or the like, the texture of the textile product tends to be further enhanced.

The number of carbon atoms of the hydrocarbon group is more preferably 12 to 21. In a case in which the number of carbon atoms is in this range, especially excellent water repellency and texture are obtained. A particularly preferred hydrocarbon group is a linear alkyl group having 12 to 18 carbon atoms.

Examples of the component (A) include stearyl(meth) acrylate, cetyl(meth)acrylate, lauryl(meth)acrylate, dodecyl (meth)acrylate, myristyl(meth)acrylate, pentadecyl(meth) acrylate, heptadecyl(meth)acrylate, nonadecyl(meth) acrylate, eicosyl(meth)acrylate, heneicosyl(meth)acrylate, behenyl(meth)acrylate, ceryl(meth)acrylate, and melissyl (meth)acrylate.

The component (A) can have at least one functional group selected from the group consisting of a hydroxy group, an amino group, a carboxy group, an epoxy group, and an isocyanate group, all of which can react with a crosslinking agent. In this case, the durable water repellency of the textile product thus obtainable can be further enhanced. The isocyanate group may form a blocked isocyanate group that is protected with a blocking agent. Furthermore, in a case in which the component (A) has an amino group, the texture of the textile product thus obtainable can be further enhanced.

The component (A) is preferably a monofunctional (meth) acrylic acid ester monomer having one polymerizable unsaturated group in one molecule.

Regarding the component (A), one kind may be used alone, or two or more kinds thereof may be used in combination.

Regarding the component (A), it is preferable to use an acrylic acid ester monomer (a1) and a methacrylic acid ester monomer (a2) in combination, from the viewpoint of the durable water repellency of the textile product thus obtainable. The ratio (a1)/(a2) of the mass of the component (a1) and the mass of the component (a2) that are mixed is preferably 30/70 to 90/10, more preferably 40/60 to 85/15, and even more preferably 50/50 to 80/20. In a case in which the ratio (a1)(a2) is within the range described above, the textile product thus obtainable acquires more satisfactory durable water repellency.

The total compositional proportion of the monomers of the component (A) in the non-fluorinated acrylic polymer is preferably 50% to 100% by mass, more preferably 55% to 100% by mass, and even more preferably 60% to 100% by mass, with respect to the total amount of the monomer components that constitute the non-fluorinated polymer, from the viewpoints of the water repellency and the durable water repellency of the textile product thus obtainable.

It is preferable that the non-fluorinated acrylic polymer contains, in addition to the component (A), at least one reactive emulsifier (B) (hereinafter, also referred to as "component (B)") selected from among (B1) a compound represented by the following General Formula (I-1) and having a HLB of 7 to 18; (B2) a compound represented by the following General Formula (II-1) and having a HLB of 7 to 18; and (B3) a compound having a HLB of 7 to 18 and obtainable by adding an alkylene oxide having 2 to 4 carbon atoms to an oil or fat having a hydroxy group and a polymerizable unsaturated group, as a monomer component, from the viewpoint that the water repellency of the textile product thus obtainable, and the emulsion stability in the composition during emulsion polymerization or dispersion polymerization and after polymerization of the non-fluorinated acrylic polymer can be further enhanced.

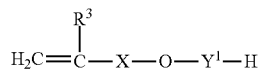
(I-1)

wherein in Formula (I-1), $R^3$ represents a hydrogen or a methyl group; X represents a linear or branched alkylene group having 1 to 6 carbon atoms; and $Y^1$ represents a divalent group including an alkyleneoxy group having 2 to 4 carbon atoms.

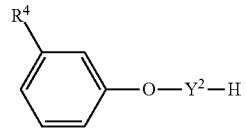
(II-1)

wherein in Formula (II-1), $R^4$ represents a monovalent unsaturated hydrocarbon group having 13 to 17 carbon atoms and having a polymerizable unsaturated group; and $Y^2$ represents a divalent group including an alkyleneoxy group having 2 to 4 carbon atoms.

The "reactive emulsifier" is an emulsion dispersant having radical reactivity, that is, a surfactant having one or more polymerizable unsaturated groups in the molecule, and can be copolymerized with a monomer such as a (meth)acrylic acid ester.

Furthermore, the "HLB" is a HLB value calculated by the Griffin method by considering an ethyleneoxy group as a hydrophilic group and all other groups as lipophilic groups.

The HLB values of the compounds of (B1) to (B3) used for the present embodiment are 7 to 18, and from the viewpoint of the emulsion stability in the composition during emulsion polymerization or dispersion polymerization and after polymerization of the non-fluorinated acrylic polymer (hereinafter, simply referred to as emulsion stability), the HLB values are preferably 9 to 15. Furthermore, from the viewpoint of storage stability of the water repellent agent composition, it is more preferable to use two or more kinds of reactive emulsifiers (B) having different HLB values within the above-described range in combination.

In regard to the reactive emulsifier (B1) represented by General Formula (I-1) described above, which is used for the present embodiment, $R^3$ represents a hydrogen or a methyl group, and it is more preferable that $R^3$ is a methyl group in view of copolymerizability with the component (A). X represents a linear or branched alkylene group having 1 to 6 carbon atoms, and from the viewpoint of the emulsion stability of the non-fluorinated acrylic polymer of the present embodiment, a linear alkylene group having 2 or 3 carbon atoms is more preferred. $Y^1$ represents a divalent group including an alkyleneoxy group having 2 to 4 carbon atoms. The type, combination, and the number of addition of the alkyleneoxy group in $Y^1$ can be selected as appropriate such that the HLB value is within the range described above. Furthermore, in a case in which two or more kinds of alkyleneoxy groups are used, they can have a block addition structure or a random addition structure.

The compound represented by General Formula (I-1) described above is preferably a compound represented by the following General Formula (I-2).

wherein in Formula (I-2), $R^3$ represents a hydrogen or a methyl group; X represents a linear or branched alkylene group having 1 to 6 carbon atoms; $A^1O$ represents an alkyleneoxy group having 2 to 4 carbon atoms; m can be selected as appropriate such that the HLB value is within the range described above, while specifically, m is preferably an integer from 1 to 80; and when m is 2 or more, m units of $A^1O$ may be identical or different.

In regard to the compound represented by General Formula (I-2) described above, $R^3$ represents a hydrogen or a methyl group, and it is more preferable that $R^3$ is a methyl group from the viewpoint of copolymerizability with the component (A). X represents a linear or branched alkylene group having 1 to 6 carbon atoms, and from the viewpoint of the emulsion stability of the non-fluorinated acrylic polymer, a linear alkylene group having 2 or 3 carbon atoms is more preferable. $A^1O$ represents an alkyleneoxy group having 2 to 4 carbon atoms. The type and combination of $A^1O$, and the number of m can be selected as appropriate such that the HLB value is within the range described above. From the viewpoint of the emulsion stability of the non-fluorinated acrylic polymer, m is preferably an integer from 1 to 80, and more preferably an integer from 1 to 60. When m is 2 or more, m units of $A^1O$ may be identical or different. Furthermore, in a case in which two or more kinds of $A^1O$ are used, they can have a block addition structure or a random addition structure.

The reactive emulsifier (B1) represented by General Formula (I-2) described above can be obtained by a conventionally known method and is not particularly limited. Furthermore, the reactive emulsifier (B1) is easily available from commercially available products, and examples may include "LATEMUL PD-420," "LATEMUL PD-430," and "LATEMUL PD-450" manufactured by Kao Corporation.

In regard to the reactive emulsifier (B2) represented by General Formula (II-1) described above, which is used for the present embodiment, R represents a monovalent unsaturated hydrocarbon group having 13 to 17 carbon atoms and having a polymerizable unsaturated group, and examples include a tridecenyl group, a tridecadienyl group, a tetradecenyl group, a tetradienyl group, a pentadecenyl group, a pentadecadienyl group, a pentadecatrienyl group, a heptadecenyl group, a heptadecadienyl group, and a heptadecatrienyl group. From the viewpoint of the emulsion stability of the non-fluorinated polymer, $R^4$ is more preferably a monovalent unsaturated hydrocarbon group having 14 to 16 carbon atoms.

$Y^2$ represents a divalent group including an alkyleneoxy group having 2 to 4 carbon atoms. The type, combination, and the number of addition of the alkyleneoxy group for $Y^2$ can be selected as appropriate such that the HLB value is within the range described above. Furthermore, in a case in which two or more kinds of alkyleneoxy groups are used, they can have a block addition structure or a random addition structure. From the viewpoint of the emulsion stability of the non-fluorinated acrylic polymer, the alkyleneoxy group is more preferably an ethyleneoxy group.

The compound represented by General Formula (II-1) described above is preferably a compound represented by the following General Formula (II-2).

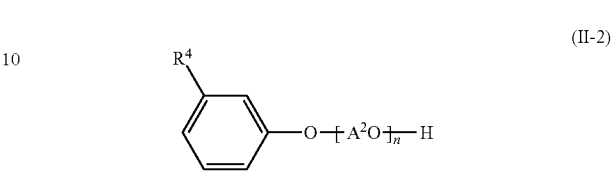

wherein in Formula (I-2), $R^4$ represents a monovalent unsaturated hydrocarbon group having 13 to 17 carbon atoms and having a polymerizable unsaturated group; $A^2O$ represents an alkyleneoxy group having 2 to 4 carbon atoms; n can be selected as appropriate such that the HLB value is within the range described above, while specifically, n is preferably an integer from 1 to 50; and when n is 2 or more, n units of $A^2O$ may be identical or different.

Examples of $R^4$ for the compound represented by General Formula (II-2) described above include groups similar to $R^4$ for the General Formula (II-1) described above.

$A^2O$ represents an alkyleneoxy group having 2 to 4 carbon atoms. In view of the emulsion stability of the non-fluorinated acrylic polymer, the type and combination of $A^2O$ and the number of n can be selected as appropriate such that the HLB value is within the range described above. In view of the emulsion stability of the non-fluorinated acrylic polymer, $A^2O$ is more preferably an ethyleneoxy group, and n is preferably an integer from 1 to 50, more preferably an integer from 5 to 20, and even more preferably an integer from 8 to 14. When n is 2 or more, n units of $A^2O$ may be identical or different. Furthermore, in a case in which two or more kinds of $A^2O$ are used, they can have a block addition structure or a random addition structure.

The reactive emulsifier (B2) represented by General Formula (II-2) described above, which is used for the present embodiment, can be synthesized by adding an alkylene oxide to a phenol having a corresponding unsaturated hydrocarbon group by a conventionally known method, and there are no particular limitations. For example, the reactive emulsifier (B2) can be synthesized by adding a predetermined amount of an alkylene oxide using an alkali catalyst such as caustic soda or caustic potash under pressure at 120° C. to 170° C.

The phenol having a corresponding unsaturated hydrocarbon group includes industrially produced pure products or mixtures, as well as pure products or mixtures extracted and purified from plants and the like. Examples include 3-[8(Z),11(Z),14-pentadecatrienyl]phenol, 3-[8(Z),11(Z)-pentadecadienyl]phenol, 3-[8(Z)-pentadecenyl]phenol, and 3-[11(Z)-pentadecenyl]phenol, which are extracted from cashew nut shell and the like and are collectively called cardanols.

The reactive emulsifier (B3) used for the present embodiment is a compound having a HLB of 7 to 18 and obtainable by adding an alkylene oxide having 2 to 4 carbon atoms to an oil or fat having a hydroxy group and a polymerizable unsaturated group. Examples of the oil or fat having a hydroxy group and a polymerizable unsaturated group may include mono- or diglycerides of fatty acids which may include unsaturated fatty acids (palmitoleic acid, oleic acid, linoleic acid, α-linolenic acid, arachidonic acid, eicosapentaenoic acid, docosapentaenic acid, and the like); and triglycerides of fatty acids including at least one hydroxy unsaturated fatty acid (ricinolic acid, ricinelaidic acid, 2-hydroxytetracosenoic acid, and the like). In view of the emulsion stability of the non-fluorinated polymer, an alkylene oxide adduct of a triglyceride of a fatty acid including at least one hydroxy unsaturated fatty acid is preferred; a C2-C4 alkylene oxide adduct of castor oil (triglyceride of fatty acids including ricinolic acid) is more preferred; and an ethylene oxide adduct of castor oil is even more preferred. Furthermore, the number of added moles of the alkylene oxide can be selected as appropriate such that the HLB value is within the range described above, and in view of the emulsion stability of the non-fluorinated acrylic polymer, the number of added moles is more preferably 20 to 50 moles, and even more preferably 25 to 45 moles. Furthermore, in a case in which two or more kinds of alkylene oxides are used, they can have a block addition structure or a random addition structure.

The reactive emulsifier (B3) used for the present embodiment can be synthesized by adding an alkylene oxide to an oil or fat having a hydroxy group and a polymerizable unsaturated group by a conventionally known method, and there are no particular limitations. For example, the reactive emulsifier (B3) can be synthesized by adding a predetermined amount of an alkylene oxide to triglycerides of fatty acids including ricinoleic acid, that is, castor oil, using an alkali catalyst such as caustic soda or caustic potash under pressure at 120° C. to 170° C.

From the viewpoint that the water repellency of the textile product thus obtainable, and the emulsion stability of the non-fluorinated acrylic polymer can be further enhanced, the compositional proportion of the monomer of the component (B) in the non-fluorinated acrylic polymer is preferably 0.5% to 20% by mass, more preferably 1% to 15% by mass, and even more preferably 3% to 10% by mass, with respect to the total amount of the monomer components that constitute the non-fluorinated acrylic polymer.

From the viewpoint that the durable water repellency of the textile product thus obtainable can be further enhanced, it is preferable that the non-fluorinated acrylic polymer contains, as a monomer component, at least one second (meth)acrylic acid ester monomer (C) (hereinafter, also referred to as "component (C)") selected from the group consisting of the following (C1), (C2), (C3), (C4), and (C5), in addition to the component (A).

(C1) is a (meth)acrylic acid ester monomer represented by the following General Formula (C-1) other than (C5).

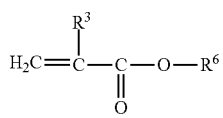
(C-1)

wherein in Formula (C-1), R represents a hydrogen or a methyl group; and $R^6$ represents a monovalent chain-like hydrocarbon group having 1 to 11 carbon atoms and having at least one functional group selected from the group consisting of a hydroxy group, an amino group, a carboxy group, an epoxy group, an isocyanate group, and a (meth) acryloyloxy group, provided that the number of (meth) acryloyloxy groups in the molecule is 2 or less.

(C2) is a (meth)acrylic acid ester monomer represented by the following General Formula (C-2).

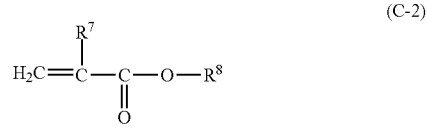
(C-2)

wherein in Formula (C-2), $R^7$ represents a hydrogen or a methyl group; and $R^8$ represents a monovalent cyclic hydrocarbon group having 1 to 11 carbon atoms which may have a substituent.

(C3) is a methacrylic acid ester monomer represented by the following General Formula (C-3).

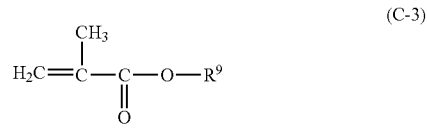
(C-3)

wherein in Formula (C-3), R represents an unsubstituted monovalent chain-like hydrocarbon group having 1 to 4 carbon atoms.

(C4) is a (meth)acrylic acid ester monomer represented by the following General Formula (C-4).

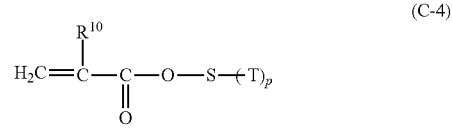
(C-4)

wherein in Formula (C-4), $R^1$ represents a hydrogen or a methyl group; p represents an integer of 2 or larger, S represents an organic group having a valence of (p+1); and T represents a monovalent organic group having a polymerizable unsaturated group.

(C5) is a (meth)acrylic acid ester monomer represented by the following General Formula (C-5).

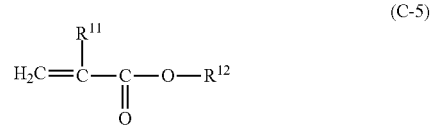
(C-5)

wherein in Formula (C-5), $R^{11}$ represents a hydrogen or a methyl group; and $R^{12}$ represents a monovalent chain-like saturated hydrocarbon group having 3 to 6 carbon atoms and having a hydroxy group and at least one functional group selected from the group consisting of a chloro group and a bromo group.

The monomer of (C1) is a (meth)acrylic acid ester monomer having a monovalent chain-like hydrocarbon group having 1 to 11 carbon atoms and having at least one functional group selected from the group consisting of a hydroxy group, an amino group, a carboxy group, an epoxy group, an isocyanate group, and a (meth)acryloyloxy group in the ester moiety and is a (meth)acrylic acid ester monomer other than (C5) described above. From the viewpoint of being capable of reacting with a crosslinking agent, it is preferable that the monovalent chain-like hydrocarbon group having 1 to 11 carbon atoms has at least one functional group selected from the group consisting of a hydroxy group, an amino group, a carboxy group, an epoxy group, and an isocyanate group. In a case in which a non-fluorinated acrylic polymer containing the monomer of (C1) having such a group that is capable of reacting with a crosslinking agent is used to treat a textile product together with a crosslinking agent, the durable water repellency can be further enhanced while the texture of the textile product thus obtainable is maintained. The isocyanate group may be a blocked isocyanate group that is protected with a blocking agent.

The chain-like hydrocarbon group may be linear or branched, and may be a saturated hydrocarbon group or an unsaturated hydrocarbon group. Furthermore, the chain-like hydrocarbon group may further have a substituent other than the functional group. Above all, the chain-like hydrocarbon group is preferably a linear group, and/or a saturated hydrocarbon group, from the viewpoint that the durable water repellency of the textile product thus obtainable can be further enhanced.

Specific examples of the monomer of (C1) include 2-hydroxyethyl(meth)acrylate, dimethylaminoethyl(meth)acrylate, glycidyl(meth)acrylate, and 1,1-bis(acryloyloxymethyl)ethyl isocyanate. These monomers may be used singly, or two or more kinds thereof may be used in combination. Among them, 2-hydroxyethyl(meth)acrylate, glycidyl (meth)acrylate, and 1,1-bis(acryloyloxymethyl)ethyl isocyanate are preferred from the viewpoint that the durable water repellency of the textile product thus obtainable can be further enhanced. Furthermore, from the viewpoint of further enhancing the texture of the textile product thus obtainable, dimethylaminoethyl (meth)acrylate is preferred.

The compositional proportion of the monomer of (C1) in the non-fluorinated acrylic polymer is preferably 1% to 30% by mass, more preferably 3% to 25% by mass, and even more preferably 5% to 20% by mass, with respect to the total amount of the monomer components that constitute the non-fluorinated acrylic polymer, from the viewpoints of the water repellency and the texture of the textile product thus obtainable.

The monomer of (C2) is a (meth)acrylic acid ester monomer having a monovalent cyclic hydrocarbon group having 1 to 11 carbon atoms in the ester moiety, and examples of the cyclic hydrocarbon group include an isobornyl group, a cyclohexyl group, and a dicyclopentanyl group. These cyclic hydrocarbon groups may each have a substituent such as an alkyl group. However, in a case in which the substituent is a hydrocarbon group, a hydrocarbon group in which the sum total of the numbers of carbon atoms of the substituent and the cyclic hydrocarbon group is 11 or less is selected. Furthermore, it is preferable that these cyclic hydrocarbon groups are directly bonded to an ester bond, from the viewpoint of further enhancing the durable water repellency. The cyclic hydrocarbon group may be alicyclic or aromatic, and in the case of an alicyclic group, the cyclic hydrocarbon group may be a saturated hydrocarbon group or an unsaturated hydrocarbon group. Specific examples of the monomer include isobornyl(meth)acrylate, cyclohexyl(meth)acrylate, and dicyclopentanyl(meth)acrylate. These monomers may be used singly, or two or more kinds thereof may be used in combination. Among them, isobornyl (meth)acrylate and cyclohexyl methacrylate are preferred, and isobornyl methacrylate is more preferred, from the viewpoint that the durable water repellency of the textile product thus obtainable can be further enhanced.

The compositional proportion of the monomer of (C2) in the non-fluorinated acrylic polymer is preferably 1% to 30% by mass, more preferably 3% to 25% by mass, and even more preferably 5% to 20% by mass, with respect to the total amount of the monomer components that constitute the non-fluorinated acrylic polymer, from the viewpoints of the water repellency and the texture of the textile product thus obtainable.

The monomer of (C3) is a methacrylic acid ester monomer in which an unsubstituted monovalent chain-like hydrocarbon group having 1 to 4 carbon atoms is directly bonded to the ester bond of the ester moiety. Regarding the chain-like hydrocarbon group having 1 to 4 carbon atoms, a linear hydrocarbon group having 1 or 2 carbon atoms and a branched hydrocarbon group having 3 or 4 carbon atoms are preferred. Examples of the chain-like hydrocarbon group having 1 to 4 carbon atoms include a methyl group, an ethyl group, a n-propyl group, an isopropyl group, a n-butyl group, and a t-butyl group. Specific examples of the compound include methyl methacrylate, ethyl methacrylate, n-propyl methacrylate, isopropyl methacrylate, n-butyl methacrylate, isobutyl methacrylate, and t-butyl methacrylate. These monomers may be used singly, or two or more kinds thereof may be used in combination. Among them, methyl methacrylate, isopropyl methacrylate, and t-butyl methacrylate are preferred, and methyl methacrylate is more preferred, from the viewpoint that the durable water repellency of the textile product thus obtainable can be further enhanced.

The compositional proportion of the monomer of (C3) in the non-fluorinated acrylic polymer is preferably 1% to 30% by mass, more preferably 3% to 25% by mass, and even more preferably 5% to 20% by mass, with respect to the total amount of the monomer components that constitute the non-fluorinated polymer, from the viewpoints of the water repellency and the texture of the textile product thus obtainable.

The monomer of (C4) is a (meth)acrylic acid ester monomer having three or more polymerizable unsaturated groups in one molecule. In the present embodiment, a polyfunctional (meth)acrylic acid ester monomer having three or more (meth)acryloyloxy groups in one molecule, in which T in General Formula (C-4) described above is a (meth) acryloyloxy group, is preferred. In Formula (C-4), p units of T may be identical or different. Specific examples of the compound include ethoxylated isocyanuric acid triacrylate, tetramethylolmethane tetraacrylate, tetramethylolmethane tetramethacrylate, trimethylolpropane triacrylate, trimethylolpropane trimethacrylate, pentaerythritol triacrylate, pentaerythritol trimethacrylate, dipentaerythritol hexaacrylate, and dipentaerythritol hexamethylacrylate. These monomers may be used singly, or two or more kinds thereof may be used in combination. Among them, tetramethylolmethane tetraacrylate and ethoxylated isocyanuric acid triacrylate are more preferred from the viewpoint that the durable water repellency of the textile product thus obtainable can be further enhanced.

The compositional proportion of the monomer of (C4) in the non-fluorinated acrylic polymer is preferably 1% to 30/by mass, more preferably 3% to 25% by mass, and even more preferably 5% to 20/by mass, with respect to the total amount of the monomer components that constitute the non-fluorinated acrylic polymer, from the viewpoints of the water repellency and the texture of the textile product thus obtainable.

The monomer of (C5) has a monovalent chain-like saturated hydrocarbon group having 3 to 6 carbon atoms and having a hydroxy group and at least one functional group selected from the group consisting of a chloro group and a bromo group. In regard to the monomer of (C5), $R^{11}$ represents a hydrogen or a methyl group. In view of the durable water repellency of the textile product thus obtainable, $R^{11}$ preferably represents a methyl group.

$R^{12}$ represents a monovalent chain-like saturated hydrocarbon group having 3 to 6 carbon atoms and having a hydroxy group and at least one functional group selected from the group consisting of a chloro group and a bromo group. The chain-like saturated hydrocarbon group may be linear or branched. In a case in which the chain-like saturated hydrocarbon group is linear, superior durable water repellency of the textile product thus obtainable is obtained. The number of carbon atoms of the chain-like saturated hydrocarbon group is preferably 3 or 4 and more preferably 3, in view of the durable water repellency of the textile product thus obtainable.

The chain-like saturated hydrocarbon group preferably has one or two chloro groups and one hydroxy group and more preferably has one chloro group and one hydroxy group, in view of the durable water repellency of the textile product thus obtainable. Furthermore, the chain-like saturated hydrocarbon group even more preferably has a hydroxy group at the β-position (a carbon atom adjacent to a carbon atom bonded to $CH_2$=$CR^{11}$(CO)O—), in view of the durable water repellency of the textile product thus obtainable. Specific examples of the chain-like saturated hydrocarbon group include a 3-chloro-2-hydroxypropyl group, a 3-chloro-2-hydroxybutyl group, a 5-chloro-2-hydroxypentyl group, a 3-chloro-2-hydroxy-2-methylpropyl group, and a 3-bromo-2-hydroxypropyl group.

Specific examples of the monomer of (C5) include 3-chloro-2-hydroxypropyl(meth)acrylate, 3-chloro-2-hydroxybutyl(meth)acrylate, 5-chloro-2-hydroxypentyl(meth)acrylate, and 3-bromo-2-hydroxypropyl(meth)acrylate. Among these, from the viewpoint that the durable water repellency of the textile product thus obtainable can be further enhanced, 3-chloro-2-hydroxypropyl (meth)acrylate is preferred and 3-chloro-2-hydroxypropyl methacrylate is more preferred.

The total compositional proportion of the monomers of (C5) in the non-fluorinated acrylic polymer is preferably 1% to 30% by mass, more preferably 3% to 25% by mass, even more preferably 5% to 20% by mass, with respect to the total amount of the monomer components that constitute the non-fluorinated acrylic polymer, from the viewpoint of the durable water repellency of the textile product thus obtainable.

The total compositional proportion of the monomers of the component (C) in the non-fluorinated acrylic polymer is preferably 1% to 30% by mass, more preferably 3% to 25% by mass, and even more preferably 5% to 20% by mass, with respect to the total amount of the monomer components that constitute the non-fluorinated acrylic polymer, from the viewpoints of the water repellency and the texture of the textile product thus obtainable.

The non-fluorinated acrylic polymer can contain, in addition to the component (A), the component (B), and the component (C), a monofunctional monomer (D) capable of being copolymerized with these components (hereinafter, also referred to as "component (D)"), to the extent that the effects of the present invention are not impaired.

Examples of the monomer of (D) include vinyl-based monomers other than the component (E), which do not contain fluorine, such as (meth)acryloylmorpholine, a (meth)acrylic acid ester having a hydrocarbon group other than the component (A) and the component (C), (meth)acrylic acid, fumaric acid ester, maleic acid ester, fumaric acid, maleic acid, (meth)acrylamide, N-methylolacrylamide, vinyl ethers, vinyl esters, ethylene, and styrene. Incidentally, the (meth)acrylic acid ester having a hydrocarbon group, which is other than the component (A) and the component (C), may have a substituent such as a vinyl group, a hydroxy group, an amino group, an epoxy group, and an isocyanate group, blocked isocyanate group as the hydrocarbon group, may have a substituent other than a group that can react with a crosslinking agent such as a quaternary ammonium group, and may have an ether bond, an ester bond, an amide bond, a urethane bond, or the like. Examples of the (meth)acrylic acid ester other than the component (A) and the component (C) include methyl acrylate, 2-ethylhexyl(meth)acrylate, benzyl(meth)acrylate, and ethylene glycol di(meth)acrylate.

The compositional proportion of the monomer of the component (D) in the non-fluorinated acrylic polymer is preferably 10% by mass or less with respect to the total amount of the monomer components that constitute the non-fluorinated acrylic polymer, from the viewpoints of the water repellency and the texture of the textile product thus obtainable.

It is preferable that the non-fluorinated acrylic polymer has at least one functional group selected from the group consisting of a hydroxy group, an amino group, a carboxy group, an epoxy group, and an isocyanate group, which are all capable of reacting with a crosslinking agent, from the viewpoint of further enhancing the durable water repellency of the textile product thus obtainable. The isocyanate group may form a blocked isocyanate group that is protected with a blocking agent. Furthermore, it is preferable that the non-fluorinated acrylic polymer has an amino group, from the viewpoint of further enhancing the texture of the textile product thus obtainable as well.

It is preferable the non-fluorinated acrylic polymer contains at least one monomer (E) from between vinyl chloride and vinylidene chloride (hereinafter, also referred to as "component (E)") as the monomer component in addition to the component (A), from the viewpoint that the water repellency of the textile product thus obtainable and the peeling strength with respect to a coating can be further enhanced.

The at least one monomer (E) from between vinyl chloride and vinylidene chloride, which is used for the present embodiment, is preferably vinyl chloride from the viewpoints of the water repellency of the textile product thus obtainable and the peeling strength with respect to a coating.

The compositional proportion of the monomer of the component (E) in the non-fluorinated acrylic polymer is preferably 1% to 45% by mass, more preferably 3% to 40% by mass, and even more preferably 5% to 35% by mass, with respect to the total amount of the monomer components that constitute the non-fluorinated acrylic polymer, from the viewpoint that the peeling strength with respect to a coating of the textile product thus obtainable can be further enhanced.

A method for producing the non-fluorinated acrylic polymer will be described.

The non-fluorinated acrylic polymer can be produced by a radical polymerization method. Furthermore, from this radical polymerization method, it is preferable that polymerization is carried out by an emulsion polymerization method or a dispersion polymerization method, in view of the performance of the water repellent agent thus obtainable and in an environmental aspect.

For example, a non-fluorinated acrylic polymer can be obtained by subjecting the (meth)acrylic acid ester monomer (A) represented by General Formula (A-1) described above to emulsion polymerization or dispersion polymerization in a medium. More specifically, for example, the component (A), and if necessary, the component (B), the component (C), the component (D), and the component (B), as well as an emulsification aid or a dispersion aid are added to a medium, this mixed liquid is emulsified or dispersed, and thereby, an emulsion or a dispersion is obtained. As a polymerization initiator is added to the emulsion or dispersion thus obtained, a polymerization reaction is initiated, and thus the monomers and the reactive emulsifier can be polymerized. Incidentally, examples of the means for emulsifying or dispersing the mixed liquid include a homomixer, a high pressure emulsifying machine, or an ultrasonicator.

Regarding the emulsification aid or dispersion aid (hereinafter, also referred to as "emulsification aid or the like"), one or more selected from a nonionic surfactant, a cationic surfactant, an anionic surfactant, and an amphoteric surfactant, all other than the reactive emulsifier (B), can be used. The content of the emulsification aid or the like is preferably 0.5 to 30 parts by mass, more preferably 1 to 20 parts by mass, and even more preferably 1 to 10 parts by mass, with respect to 100 parts by mass of all the monomers. If the content of the emulsification aid or the like is 0.5 part by mass or more, the dispersion stability of the mixed liquid tends to be further enhanced. If the content of the emulsification aid or the like is 30 parts by mass or less, the water repellency of the water repellent agent composition thus obtainable tends to be further enhanced.

The medium for the emulsion polymerization or dispersion polymerization is preferably water, and if necessary, water may be mixed with an organic solvent. Examples of the organic solvent used at this time include alcohols such as methanol and ethanol; esters such as ethyl acetate; ketones such as acetone and methyl ethyl ketone; ethers such as diethyl ether; and glycols such as propylene glycol, dipropylene glycol, and tripropylene glycol. Incidentally, the ratio of water and the organic solvent is not particularly limited.

Regarding the polymerization initiator, known polymerization initiators such as azo-based, peroxide-based, or redox-based polymerization initiators can be used as appropriate. The content of the polymerization initiator is preferably 0.01 to 2 parts by mass with respect to 100 parts by mass of all the monomers. When the content of the polymerization initiator is in the range described above, a non-fluorinated acrylic polymer having a weight average molecular weight of 100,000 or more can be produced efficiently.

Furthermore, a chain transfer agent such as dodecylmercaptan or t-butyl alcohol may also be used in the polymerization reaction for the purpose of adjusting the molecular weight.

Incidentally, a polymerization inhibitor may also be used for the adjustment of the molecular weight A non-fluorinated acrylic polymer having a desired weight average molecular weight can be easily obtained by adding a polymerization inhibitor.

The temperature of the polymerization reaction is preferably 20° C. to 150° C. If the temperature is 20° C. or higher, polymerization tends to be likely to proceed sufficiently, and if the temperature is 150° C. or lower, control of the reaction heat is likely to become easy.

In regard to the polymerization reaction, the weight average molecular weight of the non-fluorinated acrylic polymer thus obtainable can be adjusted by increasing or decreasing the content of the polymerization initiator, chain transfer agent, and polymerization inhibitor mentioned above, and the melt viscosity at 105° C. can be adjusted by increasing or decreasing the content of the polyfunctional monomer and the content of the polymerization initiator. Incidentally, in a case in which the melt viscosity at 105° C. is desired to be decreased, the content of a monomer having two or more polymerizable functional groups may be decreased, or the content of the polymerization initiator may be increased.

The content of the non-fluorinated acrylic polymer in the polymer emulsion liquid or dispersion liquid obtainable by emulsion polymerization or dispersion polymerization is preferably adjusted to 10% to 50% by mass and more preferably to 20% to 40% by mass, with respect to the total amount of the emulsion liquid or dispersion liquid, from the viewpoints of the storage stability and the handleability of the composition.

Examples of the hydrocarbon group-containing compound include NEOSEED NR-90 (manufactured by NICCA CHEMICAL CO., LTD.), NR-158 (manufactured by NICCA CHEMICAL CO., LTD.), TH-44 (manufactured by NICCA CHEMICAL CO., LTD.), PW-182 (manufactured by DAIWA CHEMICAL INDUSTRIES CO., LTD.) PHOBOL, RSH (manufactured by Huntsman Japan KK), PARAGIUM ECO-500 (manufactured by Ohara Paragium Chemical Co., Ltd.), and NX018 (manufactured by NANO-TEX CORPORATION).

<Other Components>

The water repellent agent composition of the present embodiment may further contain, in addition to the respective components described above, a polyfunctional isocyanate compound, a surfactant, an antifoaming agent, an organic acid, an inorganic acid, an alcohol, an antibacterial agent, an antifungal agent, a pH adjuster, a colorant, silica, an antioxidant, a refresher, various catalysts, an emulsion stabilizer, various organic solvents other than alkylpolysiloxane, a chelating agent, an antistatic agent, organo-modified silicone other than amino-modified silicone, a cross-linking agent other than the polyfunctional isocyanate compound, or the like.

The polyfunctional isocyanate compound is not particularly limited as long as it is a compound has two or more isocyanate groups in the molecule, and conventionally known polyisocyanate compounds can be used. Examples of the polyfunctional isocyanate compound include diisocyanate compounds such as alkylene diisocyanate, aryl diisocyanate, and cycloalkyl diisocyanate, and modified polyisocyanate compounds such as dimers, trimers, or tetramers of those diisocyanate compounds. The number of carbon atoms of alkylene diisocyanate is preferably 1 to 12.

Examples of the diisocyanate compound include 2,4- or 2,6-tolylene diisocyanate, ethylene diisocyanate, propylene diisocyanate, 4,4-diphenylmethane diisocyanate, p-phenylene diisocyanate, tetramethylene diisocyanate, hexamethylene diisocyanate, decamethylene diisocyanate, dodecamethylene diisocyanate, 2,4,4-trimethyl hexamethylene-1,6-diisocyanate, phenylene diisocyanate, tolylene or naphthylene diisocyanate, 4,4'-methylene-bis(phenylisocyanate), 2,4'-methylene-bis(phenylisocyanate), 3,4'-methylene-bis(phenylisocyanate), 4,4'-ethylene-bis(phenylisocyanate), ω,ω'-diisocyanate-1,3-dimethyl benzene, ω,ω'-diisocyanate-1,4-dimethyl cyclohexane, ω,ω'-diisocyanate-1,4-dimethyl benzene, ω,ω'-diisocyanate-1,3- dimethylcyclohexane, 1-methyl-2,4-diisocyanate cyclohexane, 4,4'-methylene-bis(cyclohexyl isocyanate), 3-isocyanate-methyl-3,5,5-trimethylcyclohexylisocyanate, acid-diisocyanate dimer, ω,ω'-diisocyanate diethylbenzene, ω,ω'-diisocyanate dimethyl toluene, ω,ω'-diisocyanate diethyl toluene, fumaric acid bis(2-isocyanateethyl)ester, 1,4-bis(2-isocyanate-prop-2-yl)benzene, and 1,3-bis(2-isocyanate-prop-2-yl)benzene.

Examples of the triisocyanate compound include triphenylmethane triisocyanate and trs(isocyanatophenyl)-thiophosphate. Examples of the tetraisocyanate compound include dimethyltriphenylmethane tetraisocyanate.

The modified polyisocyanate compound derived from a diisocyanate compound is not particularly limited as long as it has two or more isocyanate groups, and examples include a polyisocyanate having a biuret structure, an isocyanurate structure, a urethane structure, a urethodione structure, an allophanate structure, or a trimer structure, and an adduct of an aliphatic isocyanate with trimethylolpropane. Furthermore, polymeric MDI (MDI=diphenylmethane diisocyanate) can also be used as the polyisocyanate compound. Regarding the polyisocyanate compound, one kind can be used alone, or two or more kinds thereof can be used in combination.

The isocyanate group of the polyfunctional isocyanate compound may be used without any change, or may be a blocked isocyanate group blocked with a blocking agent. Examples of the blocking agent include pyrazoles such as 3,5-dimethylpyrazole, 3-methylpyrazole, 3,5-dimethyl-4-nitropyrazole, 3,5-dimethyl-4-bromopyrazole, and pyrazole; phenols such as phenol, methylphenol, chlorophenol, isobutylphenol, tert-butylphenol, iso-amylphenol, octylphenol, and nonylphenol; lactams such as ε-caprolactam, δ-valerolactam, and γ-butryolactam; active methylene compounds such as dimethyl malonate, diethyl malonate, acetyl acetone, methyl acetoacetate, and ethyl acetoacetate; oximes such as formaldoxime, acetaldoxime, acetone oxime, methyl ethyl ketone oxime, cyclohexanone oxime, acetophenone oxime, and benzophenone oxime; imidazole compounds such as imidazole, 2-methyl imidazole; and sodium bisulfite. Among these, from the viewpoint of durable water repellency, pyrazoles and oximes are preferred.

As the polyfunctional isocyanate compound, water-dispersible isocyanate in which water dispersibility is imparted to polyisocyanate by introducing a hydrophilic group to a polyisocyanate structure to have surface active effect can also be used. Furthermore, in order to promote reaction between an amino group and an isocyanate group, conventionally known catalysts such as organic tin and organic zinc can also be used concurrently.

The amount of the polyfunctional isocyanate compound mixed in the water repellent agent composition of the present embodiment is preferably 1 to 200 parts by mass and more preferably 5 to 100 parts by mass, with respect to 100 parts by mass of the total of the amount of the amino-modified silicone mixed and the amount of the silicone resin mixed, from the viewpoints of water repellency, durable water repellency, and texture.

The amount of the polyfunctional isocyanate compound mixed in the second water repellent agent composition of the present embodiment is preferably 1 to 200 parts by mass and more preferably 5 to 100 parts by mass, with respect to 100 parts by mass of the total amount of the component (IV), the component (V), and the component (II) mixed, from the viewpoints of water repellency, durable water repellency, and texture.

In a case in which the water repellent agent composition of the present embodiment contains, as a water repellent component, a component other than the component (I), the component (II), the component (IV), and the component (V), the amount of the polyfunctional isocyanate compound mixed is preferably 1 to 200 parts by mass and more preferably 5 to 100 parts by mass, with respect to 100 parts by mass of the total amount of the water repellent component, from the viewpoints of water repellency, durable water repellency, and texture. In this case, the total amount of the component (I) and the component (II) mixed in the water repellent component is preferably 1% by mass or more and more preferably 10% to 90% by mass, on the basis of the total amount of the water repellent component. In the case of the second water repellent agent composition, the total amount of the component (IV), the component (V), and the component (II) mixed in the water repellent component is preferably 1% by mass or more and more preferably 10% to 90% by mass, on the basis of the total amount of the water repellent component.

The surfactant essentially contains a polyalkylene oxide adduct and may further include other surfactants. Regarding the other surfactants, for example, surfactants having roles of expanding a temperature range in which the emulsion state is stably maintained and adjusting the amount of foam generated in a case in which a diluted solution is prepared by mixing the surfactant with water may be used. The other surfactants may include any of a non-ionic surfactant, an anionic surfactant, a cationic surfactant, and an amphoteric surfactant. Regarding the other surfactants, one kind can be used alone, or two or more kinds thereof can be used in combination.

Examples of the antifoaming agent include, although not particularly limited, fat and oil-based antifoaming agents such as castor oil, sesame oil, linseed oil, and animal or vegetable oil; fatty acid-based antifoaming agents such as stearic acid, oleic acid, and palmitic acid; fatty acid ester-based antifoaming agents such as isoamyl stearate, distearyl succinate, ethylene glycol distearate, and butyl stearate; alcohol-based antifoaming agents such as polyoxyalkylene monohydric alcohol, di-t-amylphenoxyethanol, 3-heptanol, and 2-ethylhexanol; ether-based antifoaming agents such as 3-heptylcellosolve, nonylcellosolve, and 3-heptylcarbitol; phosphoric acid ester-based antifoaming agents such as tributyl phosphate and tris(butoxyethyl) phosphate; amine-based antifoaming agents such as diamylamine; amide-based antifoaming agents such as polyalkylene amide and acylated polyamine; sulfuric acid ester-based antifoaming agents such as sodium lauryl sulfate; and mineral oil. Regarding the antifoaming agent, one kind can be used alone, or two or more kinds thereof can be used in combination.

Examples of the organic acid include, although not particularly limited, lactic acid, acetic acid, propionic acid, maleic acid, oxalic acid, formic acid, methanesulfonic acid, and toluenesulfonic acid.

Regarding the organic acid, one kind can be used alone, or two or more kinds thereof can be used in combination.

Examples of the inorganic acid include, although not particularly limited, hydrogen chloride, sulfuric acid, and nitric acid. Regarding the inorganic acid, one kind can be used alone, or two or more kinds thereof can be used in combination.

Examples of the alcohol include, although not particularly limited, ethanol, isopropanol, glycerin, trimethylolpropane, diethylene glycol, triethylene glycol, dipropylene glycol, and propylene glycol. Regarding the alcohol, one kind can be used alone, or two or more kinds thereof can be used in combination.

As the antistatic agent, an antistatic agent that hardly inhibits water repellency performance may be used. Examples of the antistatic agent include cationic surfactants such as a higher alcohol sulfate ester salt, sulfated oil, a sulfonic acid salt, a quaternary ammonium salt, and an imidazoline type quaternary salt; non-ionic surfactants such as polyethylene glycol type and polyhydric alcohol ester type surfactants; amphoteric surfactants such as an imidazoline type quaternary salt, an alanine type surfactant, and a betaine type surfactant; and polymeric compound types such as anti-static polymer and polyalkylamine described above. Regarding the antistatic agent, one kind can be used alone, or two or more kinds thereof can be used in combination.

Examples of the crosslinking agent other than the polyfunctional isocyanate compound may include a melamine resin and a glyoxal resin.

As the melamine resin, a compound having a melamine skeleton can be used, and examples include polymethylol melamines such as trimethylol melamine and hexamethylol melamine; alkoxymethyl melamine in which a part or the whole of a methylol group of polymethylol melamine is substituted with an alkoxymethyl group having an alkyl group having 1 to 6 carbon atoms; and acyloxymethyl melamine in which a part or the whole of a methylol group of polymethylol melamine is substituted with an acyloxymethyl group having an acyl group having 2 to 6 carbon atoms. These melamine resins may be a monomer or a polymer of a dimer or more, or a mixture thereof may be used. Furthermore, those in which a part of melamine is co-condensated with urea or the like can be used. Examples of such a melamine resin include BECKAMINE APM, BECKAMINE M-3, BECKAMINE M-3(60), BECKAMINE MA-S, BECKAMINE J-101, and BECKAMINE J-101LF manufactured by DIC Corporation, UNIKA RESIN 380K manufactured by Union Chemical Industry Co., Ltd., and Riken Resin MM series manufactured by Mild Riken Industrial Co., Ltd.

As the glyoxal resin, conventionally known glyoxal resins can be used. Examples of the glyoxal resin include a 1,3-dimethylglyoxal urea-based resin, a dimethylol dihydroxyethylene urea-based resin, and a dimethylol dihydroxypropylene urea-based resin. The functional groups of those resins may be substituted with other functional groups. Examples of such a glyoxal resin include BECKAMINE N-80, BECKAMINE NS-11, BECKAMINE LF-K, BECKAMINE NS-19, BECKAMINE LF-55P Conc., BECKAMINE NS-210L, BECKAMINE NS-200, and BECKAMINE NF-3 manufactured by DIC Corporation, UNI RESIN GS-20E manufactured by Union Chemical Industry Co., Ltd., and Riken Resin RG series and Riken Resin MS series manufactured by Mild Riken Industrial Co., Ltd.

It is preferable to use a catalyst in the melamine resin and the glyoxal resin, from the viewpoint of promoting reaction. Such a catalyst is not particularly limited as long as it is a catalyst generally used, and examples include fluoroborate compounds such as ammonium fluoroborate and zinc fluoroborate; neutral metal salt catalysts such as magnesium chloride and magnesium sulfate; and inorganic acids such as phosphoric acid, hydrochloric acid, and boric acid. In regard to these catalysts, if necessary, organic acids such as citric acid, tartaric acid, malic acid, maleic acid, and lactic acid can also be concurrently used as a promoter. Examples of such a catalyst include CATALYST ACX, CATALYST 376, CATALYST O, CATALYST M, CATALYST G (GT), CATALYST X-110, CATALYST GT-3, and CATALYST NFC-1 manufactured by DIC Corporation, UNIKA CATALYST 3-P and UNIKA CATALYST MC-109 manufactured by Union Chemical Industry Co., Ltd., and Riken Fixer RC series, Riken Fixer MX series, and Riken Fixer RZ-5 manufactured by Mild Riken Industrial Co., Ltd.

The water repellent agent composition according to the present embodiment can be suitably used for use applications such as a textile product processing agent, a paper product processing agent, and a leather product processing agent.

A method for producing a water repellent agent composition of the present embodiment will be described.

The water repellent agent composition of the present embodiment can be obtained by mixing the amino-modified silicone, the silicone resin, and the alkylpolysiloxane which are described above. The content of each component in the water repellent agent composition of the present embodiment can be set to the preferable mixed amount described above.

The water repellent agent composition of the present embodiment may be a one-agent type obtained by mixing the amino-modified silicone, the silicone resin, and the alkylpolysiloxane in advance, a two-agent type which is divided into one agent obtained by mixing two components among the three components and one agent of the other one component, or a three-agent type in which the three components are respectively and separately contained. In regard to the water repellent agent composition of the present embodiment, it is preferable that the three components are dispersed (including, emulsified and dissolved) in an aqueous medium, from the viewpoint of ease of handling.

In a case in which the water repellent agent composition is a one-agent type obtained by mixing the component (I), the component (II), and the component (III) in advance, the water repellent agent composition of the present embodiment can be obtained by simultaneously dispersing (including, emulsifying and dissolving) the component (I), the component (II), and the component (III) in an aqueous medium, by mixing a dispersion liquid, which is obtained by dispersing at least one component of the three components in an aqueous medium, and a dispersion liquid, which is obtained by dispersing another component in an aqueous medium, or by mixing respective dispersion liquids of the component (I), the component (II), and the component (III).

As the method of dispersing the respective components in an aqueous medium, for example, a method of mixing and stirring the respective components, an aqueous medium, and as necessary, a dispersant is exemplified. In the case of mixing and stirring, conventionally known emulsifying dispersers such as Milder, a high-speed stirrer, a homogenizer, an ultrasonic homogenizer, a homomixer, a bead mill, a pearl mill, Dyno Mill, an aspek mill, a basket mill, a ball mill, a nanomizer, an artimizer, and Star Burst may be used. Regarding these emulsifying dispersers, one kind may be used alone, or two or more kinds thereof can be used in combination.

The aqueous medium is preferably water or a mixed solvent of water and a hydrophilic solvent that is miscible in water. Examples of the hydrophilic solvent include methanol, ethanol, isopropyl alcohol, ethylene glycol, diethylene glycol, hexylene glycol, glycerin, butyl glycol, butyl diglycol, SOLFIT, N-methylpyrrolidone, dimethylformamide, and dimethylsulfoxide.

It is preferable that the dispersion liquid further contains a surfactant, from the viewpoint of dispersion stability. Such a surfactant is not particularly limited as long as it can enhance emulsion dispersion stability, and examples include conventionally known non-ionic surfactants, anionic surfactants, cationic surfactants, and amphoteric surfactants. Regarding these surfactants, one kind can be used alone, or two or more kinds thereof can be used in combination.

The dispersion liquid may be used as a treatment liquid without any changes, and can also be used as a treatment liquid by being diluted with an aqueous medium or a hydrophobic organic solvent. The dispersion liquid may be used in a state of being unneutralized (being not neutralized), or the pH adjustment may be performed by a method such as neutralization of the amino-modified silicone. In the case of performing the pH adjustment, the pH of the treatment liquid can be adjusted to be 5.5 to 6.5.

The second water repellent agent composition of the present embodiment can be produced by using the component (IV) and the component (V) instead of the component (I).

A method for producing a water-repellent textile product of the present embodiment will be described.

The method of the present embodiment includes a step of treating fibers with a treatment liquid including the water repellent agent composition of the present embodiment. Through this step, a water-repellent textile product is obtainable.

The material of the fibers is not particularly limited, and examples include natural fibers such as cotton, linen, silk, and sheep wool; semi-synthetic fibers such as rayon and acetate; synthetic fibers such as nylon, polyester, polyurethane, and polypropylene; composite fibers thereof; and blend fibers. The form of fibers may be any form of thread, fabric, non-woven fabric, paper, and the like. The fibers may be a textile product.

Examples of the method of treating fibers with a treatment liquid including the water repellent agent composition of the present embodiment include a method of performing treatment by one step using a treatment liquid including the component (I), the component (II), and the component (III), a method of performing treatment by two steps using a treatment liquid including two components among the above-described three components and a treatment liquid including one component other than those two components, and a method of performing treatment by three steps using three types of dispersion liquids including the above-described three components respectively. In the case of performing treatment by two steps or three steps, the order of treatment of respective components may be any order. In the case of applying the second water repellent agent composition, the component (IV) and the component (V) may be mixed in a treatment liquid instead of the component (I).

The treatment liquid and the dispersion liquid described above may be used in a state of being unneutralized (being not neutralized), or the pH may be adjusted to 5.5 to 6.5. In pH adjustment, for example, organic acids such as lactic acid, acetic acid, propionic acid, maleic acid, oxalic acid, formic acid, methanesulfonic acid, and toluenesulfonic acid; inorganic acids such as hydrogen chloride, sulfuric acid, and nitric acid, hydroxides such as sodium hydroxide and potassium hydroxide; carbonates such as sodium carbonate, sodium hydrogen carbonate, potassium carbonate, and sodium sesquicarbonate; organic amines such as monoethanolamine, diethanolamine, triethanolamine, and triethylamine; ammonia; and the like can be used.

Examples of the method of treating fibers with the treatment liquid include processing methods such as immersion, spraying, and coating. Furthermore, in a case in which the water repellent agent composition contains water, it is preferable that the water repellent agent composition is attached to the fibers, and then the fibers are dried in order to remove water.

The amount of attachment of the water repellent agent composition of the present embodiment to fibers can be appropriately adjusted according to the degree of water repellency required; however, the amount of attachment of the water repellent agent composition is adjusted to be preferably 0.1 to 5 g and more preferably 0.1 to 3 g with respect to 100 g of fibers. When the amount of attachment of the water repellent agent composition is 0.1 g or more, there is a tendency that the fibers easily exhibit sufficient water repellency. When the amount of attachment of the water repellent agent composition is 5 g or less, the texture of the fibers tends to be further enhanced and economic advantage tends to be obtainable.

Furthermore, after the water repellent agent composition of the present embodiment is attached to the fibers, it is preferable that the fibers are heat-treated as appropriate. There are no particular limitations on the temperature conditions; however, it is preferable to perform the heat treatment at 110° C. to 180° C. for 1 to 5 minutes, from the viewpoints of water repellency, durable water repellency, and texture.

The water-repellent textile product of the present embodiment has excellent water repellency and flexible texture, and thus is suitably used for fiber use applications of clothing, bedding, and the like such as side fabric for down, coats, blousons, windbreakers, blouses, dress shirts, skirts, slacks, gloves, hats, mattress sheets, mattress covers, curtains, or tents.

EXAMPLES

Hereinafter, the present invention will be described in more detail by way of Examples; however, the present invention is not intended to be limited by these Examples.
<Preparation of Amino-Modified Silicone Dispersion Liquid>

Preparation Example A1

30 parts by mass of KF8005 (manufactured by Shin-Etsu Chemical Co., Ltd., trade name) as the amino-modified silicone, 0.3 part by mass of formic acid, and 1 part by mass of ethylene oxide 5-mol adduct of branched alcohol having 12 to 14 carbon atoms were mixed. Subsequently, 68.7 parts by mass of water was added to the obtained mixture while mixed in small amounts, thereby obtaining a dispersion liquid containing 30% by mass of the amino-modified silicone.

Preparation Examples A2 to A7

Dispersion liquids containing 30% by mass of the amino-modified silicone were obtained in the similar manner to Preparation Example A1, except that the amino-modified silicone was changed from KF8005 to amino-modified silicone described in Table 1. Incidentally, KF-868, KF-864, and KF-393 are trade names manufactured by Shin-Etsu Chemical Co., Ltd., SF-8417 and BY16-853U are trade names manufactured by Dow Corning Toray Co., Ltd., and XF42-B1989 is a trade name manufactured by Momentive Performance Materials Japan LLC.

<Physical Property of Amino-Modified Silicone>

The functional group equivalent (unit: g/mol) and the kinetic viscosity (unit: mm²/s) at 25° C. of each amino-modified silicone used above are presented in Table 1.

TABLE 1

| | Raw material | Functional group equivalent | Kinetic viscosity |
|---|---|---|---|
| Preparation Example A1 | KF8005 (side-chain diamine) | 11,000 | 1,200 |
| Preparation Example A2 | KF-868 (side-chain monoamine) | 8,800 | 90 |
| Preparation Example A3 | KF-864 (side-chain monoamine) | 3,800 | 1,700 |
| Preparation Example A4 | SF-8417 (side-chain diamine) | 1,800 | 1,200 |
| Preparation Example A5 | XF42-B1989 (side-chain amino-both-terminal cetearyl) | 1,500 | 900 |
| Preparation Example A6 | KF-393 (side-chain diamine) | 350 | 70 |
| Preparation Example A7 | BY16-853U (both terminal-modified monoamine) | 460 | 13 |

Preparation Example A8

30 parts by mass of SF-8417 (manufactured by Dow Corning Toray Co., Ltd., trade name) as the amino-modified silicone and 1 part by mass of ethylene oxide 5-mol adduct of branched alcohol having 12 to 14 carbon atoms were mixed. Subsequently, 69.0 parts by mass of water was added to the obtained mixture while mixed in small amounts, thereby obtaining a dispersion liquid containing 30% by mass of the amino-modified silicone.

<Preparation of Dispersion Liquid of Alkylpolysiloxane and Silicone Resin>

Preparation Example B1

50 parts by mass of dimethyl silicone (6 cs, manufactured by Dow Corning Toray Co., Ltd.) as the alkylpolysiloxane was added to 50 parts by mass of MQ-1600 (trimethylsilyl group-containing polysiloxane, manufactured by Dow Corning Toray Co., Ltd., trade name) as the silicone resin and mixed until the silicone resin was dissolved, thereby obtaining a mixture. 30 parts by mass of the mixture thus obtainable and 1 part by mass of ethylene oxide 5-mol adduct of branched alcohol having 12 to 14 carbon atoms were mixed. Subsequently, 69 parts by mass of water was added while mixed in small amounts, thereby obtaining a dispersion liquid containing 15% by mass of the alkylpolysiloxane and 15% by mass of the silicone resin.

Preparation Example B2

A dispersion liquid containing 15% by mass of the alkylpolysiloxane and 15% by mass of the silicone resin was obtained in the similar manner to Preparation Example B1, except that KF9021L (manufactured by Shin-Etsu Chemical Co., Ltd., trade name, solvent:low-viscosity methylpolysiloxane (KF-96L-2cs, dimethyl silicone), trimethylsilyl group-containing polysiloxane:solvent (mass ratio)=50:50) was used instead of the mixture of MQ-1600 and dimethyl silicone.

Preparation Example B3

A dispersion liquid containing 15% by mass of the alkylpolysiloxane and 15% by mass of the silicone resin was obtained in the similar manner to Preparation Example B1, except that KF7312L (manufactured by Shin-Etsu Chemical Co., Ltd., trade name, solvent: low-viscosity methylpolysiloxane (KF-96L-2cs, dimethyl silicone), trimethylsilyl group-containing polysiloxane:solvent (mass ratio)=50:50) was used instead of the mixture of MQ-1600 and dimethyl silicone.

Preparation Example B4

75 parts by mass of dimethyl silicone (6 cs, manufactured by Dow Corning Toray Co., Ltd.) as the alkylpolysiloxane was added to 25 parts by mass of MQ-1600 (trimethylsilyl group-containing polysiloxane, manufactured by Dow Corning Toray Co., Ltd., trade name) as the silicone resin and mixed until the silicone resin was dissolved, thereby obtaining a mixture. 30 parts by mass of the mixture thus obtainable and 1 part by mass of ethylene oxide 5-mol adduct of branched alcohol having 12 to 14 carbon atoms were mixed. Subsequently, 69 parts by mass of water was added while mixed in small amounts, thereby obtaining a dispersion liquid containing 22.5% by mass of the alkylpolysiloxane and 7.5% by mass of the silicone resin.

<Preparation of Polyfunctional Isocyanate Compound Dispersion Liquid>

Preparation Example C: Dispersion Liquid of Methyl Ethyl Ketoxime Blocked Product of Reaction Product of Trimethylolpropane and Toluene Diisocyanate First, as a reaction product of trimethylolpropane and toluene diisocyanate, Polurene AD (content of a reaction product of trimethylolpropane and toluene diisocyanate (the mass ratio of 2,4-isomer and 2,6-isomer being 80:20): 75% by mass, solvent:ethyl acetate, manufactured by SAPICI S.p.A., trade name) was prepared.

1 mol of the reaction product of trimethylolpropane and toluene diisocyanate prepared above was heated to 60° C. to 70° C. Subsequently, 3 mol of methyl ethyl ketoxime was slowly charged, reaction was performed until the content of isocyanate confirmed by an infrared spectrophotometer at 60° C. to 70° C. became zero, and ethyl acetate was added, thereby obtaining a colorless transparent viscous liquid composition containing 98.7% by mass of a methyl ethyl ketoxime blocked polyisocyanate compound.

180 parts by mass of the composition obtained as described above and 20 parts by mass of ethylene oxide 30-mol adduct of 3 styrenated phenol as the non-ionic surfactant were mixed and homogenized. After water was gradually charged under stirring, a homogenizer treatment was performed at 30 MPa, thereby obtaining a dispersion liquid containing 40% by mass of a methyl ethyl ketoxime blocked product of the reaction product of trimethylolpropane and toluene diisocyanate.

Preparation Example C2: Dispersion Liquid of Isocyanurate Type Methyl Ethyl Ketoxime Blocked Product of Hexamethylene Diisocyanate To a reaction container, 1 mol of Duranate THA-100 (isocyanurate type of hexamethylene diisocyanate, the number of NCO functional group: 3, content: 100% by mass, manufactured by Asahi Kasei Chemicals Corporation, trade name) and methyl isobutyl ketone were added, and heating was performed to 60° C. to 70° C. Subsequently, 3 mol of methyl ethyl ketoxime was slowly charged, and reaction was performed until the content of isocyanate confirmed by an infrared spectrophotometer at 60° C. to 70° C. became zero, thereby obtaining a colorless transparent viscous liquid composition containing 98.7% by mass of a methyl ethyl ketoxime blocked polyisocyanate compound.

180 parts by mass of the composition obtained as described above, 20 parts by mass of methyl ethyl ketone as the organic solvent, and 20 parts by mass of ethylene oxide 30-mol adduct of 3 styrenated phenol as the non-ionic surfactant were mixed and homogenized.

After water was gradually charged under stirring, a homogenizer treatment was performed at 30 MPa, thereby obtaining a dispersion liquid containing 40% by mass of an isocyanurate type methyl ethyl ketoxime blocked product of hexamethylene diisocyanate.

Preparation Example C3: Compound Blocked with Dimethylpyrazole of Hexamethylene Diisocyanate Biuret To a reaction container, 1 mol of Duranate 24A-100 (biuret type of hexamethylene diisocyanate, the number of NCO functional group: 3, content: 100% by mass, manufactured by Asahi Kasei Chemicals Corporation, trade name) and methyl isobutyl ketone were added, and heating was performed to 60° C. to 70° C. Subsequently, 3 mol of 3,5-dimethylpyrazole was slowly charged, and reaction was performed until the content of isocyanate confirmed by an infrared spectrophotometer at 60° C. to 70° C. became zero, thereby obtaining a colorless transparent viscous liquid composition containing 98.7% by mass of a dimethylpyrazole blocked polyisocyanate compound.

180 parts by mass of the composition obtained as described above, 140 parts by mass of butyl diglycol as the organic solvent, 20 parts by mass of ethylene oxide 30-mol adduct of 3 styrenated phenol as the non-ionic surfactant were mixed and homogenized. After water was gradually charged under stirring, a homogenizer treatment was performed at 30 MPa, thereby obtaining a dispersion liquid containing 40% by mass of a compound blocked with dimethylpyrazole of hexamethylene diisocyanate biuret.
<Crosslinking Agent>

Preparation Example C4

BECKAMINE M-3 (trimethylol amine, manufactured by DIC Corporation, trade name) was prepared.
<Catalyst>

Preparation Example C5

BECKAMINE ACX (organic amine-based catalyst, manufactured by DIC Corporation, trade name) was prepared.
<Preparation of Non-Fluorinated Acrylic Polymer Dispersion Liquid>

Preparation Example D1

Into a 500 mL pressure-resistant flask, 30 g of stearyl acrylate, 10 g of lauryl acrylate, 20 g of chloroethylene, 5 g of 30-mol ethylene oxide adduct of 3 styrenated phenol, 3 g of ARQUAD T-28 (manufactured by Lion Corporation, trade name, stearyl trimethyl ammonium chloride), 25 g of tripropylene glycol, and 206.7 g of water were put, and mixed and stirred at 45° C. to obtain a mixed liquid. This mixed liquid was irradiated with ultrasonic waves to disperse the whole monomer by emulsification. Subsequently, 0.3 g of azobis(isobutylamidine) dihydrochloride was added to the mixed liquid and subjected to radical polymerization at 60° C. for 6 hours in a nitrogen atmosphere, thereby obtaining a non-fluorinated acrylic polymer dispersion liquid containing 20% by mass of a non-fluorinated acrylic polymer.
<Alkylpolysiloxane Dispersion Liquid>

Preparation Example E1

30 parts by mass of dimethyl silicone (kinetic viscosity at 25° C.: 6 cs, manufactured by Dow Corning Toray Co., Ltd.) and 2 parts by mass of ethylene oxide 5-mol adduct of branched alcohol having 12 to 14 carbon atoms were mixed. Subsequently, 68 parts by mass of water was added while mixed in small amounts, thereby obtaining a dispersion liquid containing 30% by mass of alkylpolysiloxane.
<Production of Water-Repellent Textile Product>

Example 1

In a treatment liquid obtained by being diluted with water such that the content of the amino-modified silicone dispersion liquid obtained in Preparation Example A1 would be 0.3% by mass, the content of the dispersion liquid of the alkylpolysiloxane and the silicone resin obtained in Preparation Example B4 would be 3.7% by mass, the content of NICEPOLE FE-26 (antistatic agent, manufactured by NICCA CHEMICAL CO., LTD., trade name) would be 0.5% by mass, and the content of TEXPORT BG-290 (penetrating agent, manufactured by NICCA CHEMICAL CO., LTD., trade name) would be 0.5% by mass, a 100% polyester fabric or a 100% nylon fabric that had been dyed was subjected to an immersion treatment (pickup rate: 60% by mass), and then the fabric was dried at 130° C. for 1 minute. Further, in the 100% polyester fabric, the fabric was heat-treated at 180° C. for 30 seconds, and in the 100% nylon fabric, the fabric was heat-treated at 170° C. for 30 seconds, thereby obtaining a water-repellent textile product. Incidentally, in the tables, the mass ratio of the amount of the amino-modified silicone mixed and the amount of the alkylpolysiloxane mixed is presented.

Examples 2 to 11

Water-repellent textile products were respectively obtained in the similar manner to Example 1, except that the amino-modified silicone dispersion liquid presented in Table 2 or 3 was used instead of the amino-modified silicone dispersion liquid obtained in Preparation Example A1, and the amounts (% by mass) of the amino-modified silicone dispersion liquid and the dispersion liquid of the alkylpolysiloxane and the silicone resin mixed were changed as presented in Table 2 or 3.

Example 12

1.5 parts by mass of SF-8417 (manufactured by Dow Corning Toray Co., Ltd., trade name) as the amino-modified silicone, 0.1 part by mass of formic acid, 28.5 parts by mass of a mixture of MQ-1600 (manufactured by Dow Corning Toray Co., Ltd., trade name) as the silicone resin and dimethyl silicone (1:1), and 1 part by mass of ethylene oxide 5-mol adduct of branched alcohol having 12 to 14 carbon atoms were mixed. Subsequently, 68.9 parts by mass of water was added to the obtained mixture while mixed in small amounts, thereby obtaining a dispersion liquid containing 30% by mass of the amino-modified silicone, the silicone resin, and the alkylpolysiloxane in total (amino-modified silicone:alkylpolysiloxane (mass ratio)=100:950).

A water-repellent textile product was obtained in the similar manner to Example 1, except that the dispersion liquid obtained as described above was used to have 4% by mass instead of the amino-modified silicone dispersion liquid obtained in Preparation Example A1 and the dispersion liquid of the alkylpolysiloxane and the silicone resin obtained in Preparation Example B4.

Example 13

A water-repellent textile product was obtained in the similar manner to Example 1, except that the amino-modified silicone dispersion liquid presented in Table 4 was used instead of the amino-modified silicone dispersion liquid obtained in Preparation Example A1, the amounts (% by mass) of the amino-modified silicone dispersion liquid and the dispersion liquid of the alkylpolysiloxane and the silicone resin mixed were changed as presented in Table 4, and the non-fluorinated acrylic polymer dispersion liquid obtained in Preparation Example D1 was further added to have the mixed amount (% by mass) presented in Table 4.

Examples 14 and 15

Water-repellent textile products were obtained in the similar manner to Example 1, except that the amino-modified silicone dispersion liquid and the dispersion liquid of the alkylpolysiloxane and the silicone resin presented in Table 4 were used instead of the amino-modified silicone dispersion liquid obtained in Preparation Example A1 and the dispersion liquid of the alkylpolysiloxane and the silicone resin obtained in Preparation Example B4, and the amounts (% by mass) of the amino-modified silicone dispersion liquid and the dispersion liquid of the alkylpolysiloxane and the silicone resin mixed were changed as presented in Table 4.

Example 16

A water-repellent textile product was obtained in the similar manner to Example 1, except that the amino-modified silicone dispersion liquid presented in Table 5 was used instead of the amino-modified silicone dispersion liquid obtained in Preparation Example A1, and the polyfunctional isocyanate compound dispersion liquid obtained in Preparation Example C1 was farther added to have the mixed amount (% by mass) presented in Table 5.

Examples 17 and 18

Water-repellent textile products were obtained in the similar manner to Example 16, except that the type of the polyfunctional isocyanate compound dispersion liquid was changed as presented in Table 5.

Example 19

A water-repellent textile product was obtained in the similar manner to Example 16, except that the crosslinking agent of Preparation Example C4 and the catalyst of Preparation Example C5 were used to have the mixed amounts (% by mass) presented in Table 5 instead of the polyfunctional isocyanate compound dispersion liquid.

Example 20

A water-repellent textile product was obtained in the similar manner to Example 16, except that the amount (% by mass) of the polyfunctional isocyanate compound dispersion liquid mixed was changed as presented in Table 5 and the crosslinking agent of Preparation Example C4 and the catalyst of Preparation Example C5 were further added to have the mixed amounts (% by mass) presented in Table 5.

Example 21

A water-repellent textile product was respectively obtained in the similar manner to Example 1, except that the amino-modified silicone dispersion liquid obtained in Preparation Example A8 was used instead of the amino-modified silicone dispersion liquid obtained in Preparation Example A1.

Example 22

To a treatment liquid obtained by being diluted with water such that the content of the amino-modified silicone dispersion liquid obtained in Preparation Example A8 would be 0.3% by mass, the content of the dispersion liquid of the alkylpolysiloxane and the silicone resin obtained in Preparation Example B4 would be 3.7% by mass, the content of NICEPOLE FE-26 (antistatic agent, manufactured by NICCA CHEMICAL CO., LTD., trade name) would be 0.5% by mass, and the content of TEXPORT BG-290 (penetrating agent, manufactured by NICCA CHEMICAL CO., LTD., trade name) would be 0.5% by mass, acetic acid was added to adjust the pH of the treatment liquid to 6. A 100% polyester fabric or a 100% nylon fabric that had been dyed was subjected to an immersion treatment (pickup rate: 60% by mass) in this treatment liquid, and then the fabric was dried at 130° C. for 1 minute. Further, in the 100% polyester fabric, the fabric was heat-treated at 180° C. for 30 seconds, and in the 100% nylon fabric, the fabric was heat-treated at 170° C. for 30 seconds, thereby obtaining a water-repellent textile product.

Comparative Example 1

A water-repellent textile product was obtained in the similar manner to Example 1, except that the dispersion liquid of the alkylpolysiloxane and the silicone resin was not used, the type and mixed amount (% by mass) of the amino-modified silicone dispersion liquid were changed as presented in Table 7, and the polyfunctional isocyanate compound dispersion liquid obtained in Preparation Example C1 was further added to have the mixed amount (% by mass) presented in Table 7.

Comparative Example 2

A water-repellent textile product was obtained in the similar manner to Example 1, except that the amino-modified silicone dispersion liquid and the dispersion liquid of the alkylpolysiloxane and the silicone resin were not used, and the polyfunctional isocyanate compound dispersion liquid obtained in Preparation Example C1 and the non-fluorinated acrylic polymer dispersion liquid obtained in Preparation Example D1 were further added to have the mixed-amounts (% by mass) presented in Table 7.

Comparative Example 3

A water-repellent textile product was obtained in the similar manner to Example 1, except that the amino-modified silicone dispersion liquid was not used, the type and mixed amount (% by mass) of the dispersion liquid of the alkylpolysiloxane and the silicone resin were changed as presented in Table 7, and the polyfinctional isocyanate compound dispersion liquid obtained in Preparation Example C1 was further added to have the mixed amount (% by mass) presented in Table 7.

Comparative Example 4

A water-repellent textile product was obtained in the similar manner to Comparative Example 1, except that the polyfunctional isocyanate compound dispersion liquid was not used.

Comparative Example 5

A water-repellent textile product was obtained in the similar manner to Comparative Example 2, except that the polyfunctional isocyanate compound dispersion liquid was not used.

Comparative Example 6

A water-repellent textile product was obtained in the similar manner to Comparative Example 3, except that the polyfunctional isocyanate compound dispersion liquid was not used.

Comparative Example 7

A water-repellent textile product was obtained in the similar manner to Example 1, except that the type and mixed amount (% by mass) of the amino-modified silicone dispersion liquid were changed as presented in Table 8, and the alkylpolysiloxane dispersion liquid obtained in Preparation Example E1 was used to have the mixed amount (% by mass) presented in Table 7 instead of the dispersion liquid of the alkylpolysiloxane and the silicone resin.

Comparative Example 8

A water-repellent textile product was obtained in the similar manner to Comparative Example 7, except that the amounts (% by mass) of the amino-modified silicone dispersion liquid and the alkylpolysiloxane dispersion liquid mixed were changed as presented in Table 8.

Comparative Example 9

A water-repellent textile product was obtained in the similar manner to Example 1, except that the amino-modified silicone dispersion liquid and the dispersion liquid of the alkylpolysiloxane and the silicone resin presented in Table 8 were used instead of the amino-modified silicone dispersion liquid obtained in Preparation Example A1 and the dispersion liquid of the alkylpolysiloxane and the silicone resin obtained in Preparation Example B4, and the amounts (% by mass) of the amino-modified silicone dispersion liquid and the dispersion liquid of the alkylpolysiloxane and the silicone resin mixed were changed as presented in Table 8.

Comparative Example 10

A water-repellent textile product was obtained in the similar manner to Comparative Example 9, except that the amounts (% by mass) of the amino-modified silicone dispersion liquid and the dispersion liquid of the alkylpolysiloxane and the silicone resin mixed were changed as presented in Table 8.

The water repellency, water repellency after washing, texture (only polyester), and seam slippage property (only nylon) of the water-repellent textile products obtained as described above were measured. The results are presented in Tables 2 to 8.

(Water Repellency Evaluation of Textile Product)

A test was performed according to the spray method of JIS L 1092 (2009) at a shower water temperature of 20° C. The results were evaluated by the following criteria by visual inspection. Incidentally, in a case in which the characteristics were slightly satisfactory, the symbol "+" was affixed to the grade, and in a case in which the characteristics were between Grade 4 and Grade 5, the symbol "4-5" was affixed to the grade.

Water repellency: state
5: There is no moisture adhering to the surface.
4: There is slight moisture adhering to the surface.
3: The surface shows partial wetting.
2: The surface shows wetting.
1: The entire surface shows wetting.
0: Both the front surface and the back surface show complete wetting.

(Durable Water Repellency Evaluation of Textile Product)

The water-repellent textile product was washed according to the 103 method of JIS L 0217 (1995) for 10 times (L-10) and the water repellency after air drying was evaluated in the similar manner to the water repellency evaluation method described above.

(Texture Evaluation of Textile Product)

The water-repellent textile product was evaluated according to the following five grades on the basis of handling.
1: Hard~5: Soft (Seam Slippage Property Evaluation of Textile Product)

The seam slippage resistance of the water-repellent textile product was measured by 8.23 Slippage Resistance 8.23.1 Seam Slippage Method b) B Method of JIS L 1096:2010. A smaller numerical value indicates that the water-repellent textile product is excellent in seam slippage property. In particular, the case of 4 mm or less was evaluated to be favorable.

TABLE 2

| | | Example 1 | Example 2 | Example 3 | Example 4 | Example 5 | Example 6 |
|---|---|---|---|---|---|---|---|
| Amino-modified silicone dispersion liquid | Preparation Example A1 | 0.3 | — | — | — | — | — |
| | Preparation Example A2 | — | 0.3 | — | — | — | — |
| | Preparation Example A3 | — | — | 0.3 | — | — | — |

TABLE 2-continued

|  |  | Example 1 | Example 2 | Example 3 | Example 4 | Example 5 | Example 6 |
|---|---|---|---|---|---|---|---|
|  | Preparation Example A4 | — | — | — | — | — | — |
|  | Preparation Example A5 | — | — | — | 0.3 | — | — |
|  | Preparation Example A6 | — | — | — | — | 0.3 | — |
|  | Preparation Example A7 | — | — | — | — | — | 0.3 |
| Dispersion liquid of alkylpolysiloxane and silicone resin | Preparation Example B1 | — | — | — | — | — | — |
|  | Preparation Example B2 | — | — | — | — | — | — |
|  | Preparation Example B3 | — | — | — | — | — | — |
|  | Preparation Example B4 | 3.7 | 3.7 | 3.7 | 3.7 | 3.7 | 3.7 |
| (Amino-modified silicone + silicone resin + alkylpolysiloxane) dispersion liquid |  | — | — | — | — | — | — |
| Polyfunctional isocyanate compound dispersion liquid | Preparation Example C1 | — | — | — | — | — | — |
|  | Preparation Example C2 | — | — | — | — | — | — |
|  | Preparation Example C3 | — | — | — | — | — | — |
| Crosslinking agent | Preparation Example C4 | — | — | — | — | — | — |
| Catalyst | Preparation Example C5 | — | — | — | — | — | — |
| Non-fluorinated acrylic polymer dispersion liquid | Preparation Example D1 | — | — | — | — | — | — |
| Alkylpolysiloxane dispersion liquid | Preparation Example E1 | — | — | — | — | — | — |
| Antistatic agent | NICEPOLE FE-26 | 0.5 | 0.5 | 0.5 | 0.5 | 0.5 | 0.5 |
| Penetrating agent | TEXPORT BG-290 | 0.5 | 0.5 | 0.5 | 0.5 | 0.5 | 0.5 |
| Water |  | 95 | 95 | 95 | 95 | 95 | 95 |
| Amino-modified silicone:alkylpolysiloxane |  | 100:925 | 100:925 | 100:925 | 100:925 | 100:925 | 100:925 |
| Water repellency (polyester) | Washing 0 times (L-0) | 4-5 | 4 | 4-5 | 4-5 | 5 | 4-5 |
| Durable water repellency (polyester) | Washing 10 times (L-10) | 3 | 3 | 3 | 3 | 3 | 3 |
| Water repellency (nylon) | Washing 0 times (L-0) | 4-5 | 4-5 | 4 | 4-5 | 4-5 | 5 |
| Durable water repellency (nylon) | Washing 10 times (L-10) | 3 | 3+ | 3 | 3 | 3 | 3 |
| Texture (polyester) |  | 5 | 5 | 5 | 5 | 5 | 5 |
| Seam slippage property (nylon) (mm) |  | 1.9 | 1.8 | 1.7 | 1.9 | 1.8 | 1.9 |

TABLE 3

|  |  | Example 7 | Example 8 | Example 9 | Example 10 | Example 11 |
|---|---|---|---|---|---|---|
| Amino-modified silicone dispersion liquid | Preparation Example A1 | — | — | — | — | — |
|  | Preparation Example A2 | — | — | — | — | — |
|  | Preparation Example A3 | — | — | — | — | — |
|  | Preparation Example A4 | 0.5217 | 0.4 | 0.3 | 0.1 | 0.02 |
|  | Preparation Example A5 | — | — | — | — | — |
|  | Preparation Example A6 | — | — | — | — | — |
|  | Preparation Example A7 | — | — | — | — | — |
| Dispersion liquid of alkylpolysiloxane and silicone resin | Preparation Example B1 | — | — | — | — | — |
|  | Preparation Example B2 | — | — | — | — | — |
|  | Preparation Example B3 | — | — | — | — | — |
|  | Preparation Example B4 | 3.4783 | 3.6 | 3.7 | 3.9 | 3.98 |
| (Amino-modified silicone + silicone resin + alkylpolysiloxane) dispersion liquid |  | — | — | — | — | — |
| Polyfunctional isocyanate compound dispersion liquid | Preparation Example C1 | — | — | — | — | — |
|  | Preparation Example C2 | — | — | — | — | — |
|  | Preparation Example C3 | — | — | — | — | — |
| Crosslinking agent | Preparation Example C4 | — | — | — | — | — |
| Catalyst | Preparation Example C5 | — | — | — | — | — |
| Non-fluorinated acrylic polymer dispersion liquid | Preparation Example D1 | — | — | — | — | — |
| Alkylpolysiloxane dispersion liquid | Preparation Example E1 | — | — | — | — | — |
| Antistatic agent | NICEPOLE FE-26 | 0.5 | 0.5 | 0.5 | 0.5 | 0.5 |
| Penetrating agent | TEXPORT BG-290 | 0.5 | 0.5 | 0.5 | 0.5 | 0.5 |
| Water |  | 95 | 95 | 95 | 95 | 95 |
| Amino-modified silicone:alkylpolysiloxane |  | 100:500 | 100:675 | 100:925 | 100:2925 | 100:14925 |
| Water repellency (polyester) | Washing 0 times (L-0) | 4 | 4 | 4 | 4-5 | 4 |
| Durable water repellency (polyester) | Washing 10 times (L-10) | 3 | 3 | 4 | 3 | 3 |
| Water repellency (nylon) | Washin 0 times (L-0) | 4 | 4 | 4-5 | 4 | 4 |
| Durable water repellency (nylon) | Washing 10 times (L-10) | 3 | 3 | 3 | 4 | 3 |
| Texture (polyester) |  | 5 | 5 | 5 | 5 | 4 |
| Seam slippage property (nylon) (mm) |  | 1.9 | 1.9 | 1.8 | 1.7 | 1.7 |

TABLE 4

|  |  | Example 12 | Example 13 | Example 14 | Example 15 |
|---|---|---|---|---|---|
| Amino-modified silicone dispersion liquid | Preparation Example A1 | — | — | — | — |
|  | Preparation Example A2 | — | — | — | — |
|  | Preparation Example A3 | — | — | — | — |
|  | Preparation Example A4 | — | 0.15 | 0.2 | 0.2 |
|  | Preparation Example A5 | — | — | — | — |
|  | Preparation Example A6 | — | — | — | — |
|  | Preparation Example A7 | — | — | — | — |
| Dispersion liquid of alkylpolysiloxane and silicone resin | Preparation Example B1 | — | — | — | — |
|  | Preparation Example B2 | — | — | 3.8 | — |
|  | Preparation Example B3 | — | — | — | 3.8 |
|  | Preparation Example B4 | — | 1.85 | — | — |
| (Amino-modified silicone + silicone resin + alkylpolysiloxane) dispersion liquid |  | 4.0 | — | — | — |
| Polyfunctional isocyanate compound dispersion liquid | Preparation Example C1 | — | — | — | — |
|  | Preparation Example C2 | — | — | — | — |
|  | Preparation Example C3 | — | — | — | — |
| Crosslinking agent | Preparation Example C4 | — | — | — | — |
| Catalyst | Preparation Example C5 | — | — | — | — |
| Non-fluorinated acrylic polymer dispersion liquid | Preparation Example D1 | — | 1 | — | — |
| Alkylpolysiloxane dispersion liquid | Preparation Example E1 | — | — | — | — |
| Antistatic agent | NICEPOLE FE-26 | 0.5 | 0.5 | 0.5 | 0.5 |
| Penetrating agent | TEXPORT BG-290 | 0.5 | 0.5 | 0.5 | 0.5 |
| Water |  | 95 | 96 | 95 | 95 |
| Amino-modified silicone:alkylpolysiloxane |  | 100:950 | 100:925 | 100:950 | 100:950 |
| Water repellency (polyester) | Washing 0 times (L-0) | 5 | 4-5 | 5 | 4-5 |
| Durable water repellency (polyester) | Washing 10 times (L-10) | 4 | 3 | 4 | 3 |
| Water repellency (nylon) | Washing 0 times (L-0) | 4-5 | 4-5 | 4-5 | 4-5 |
| Durable water repellency (nylon) | Washing 10 times (L-10) | 4 | 4 | 4 | 3 |
| Texture (polyester) |  | 4 | 5 | 4 | 4 |
| Seam slippage property (nylon) (mm) |  | 1.8 | 2.4 | 1.8 | 1.8 |

TABLE 5

|  |  | Example 16 | Example 17 | Example 18 | Example 19 | Example 20 |
|---|---|---|---|---|---|---|
| Amino-modified silicone dispersion liquid | Preparation Example A1 | — | — | — | — | — |
|  | Preparation Example A2 | — | — | — | — | — |
|  | Preparation Example A3 | — | — | — | — | — |
|  | Preparation Example A4 | 0.3 | 0.3 | 0.3 | 0.3 | 0.3 |
|  | Preparation Example A5 | — | — | — | — | — |
|  | Preparation Example A6 | — | — | — | — | — |
|  | Preparation Example A7 | — | — | — | — | — |
| Dispersion liquid of alkylpolysiloxane and silicone resin | Preparation Example B1 | — | — | — | — | — |
|  | Preparation Example B2 | — | — | — | — | — |
|  | Preparation Example B3 | — | — | — | — | — |
|  | Preparation Example B4 | 3.7 | 3.7 | 3.7 | 3.7 | 3.7 |
| (Amino-modified silicone + silicone resin + alkylpolysiloxane) dispersion liquid |  | — | — | — | — | — |
| Polyfunctional isocyanate compound dispersion liquid | Preparation Example C1 | 1 | — | — | — | 0.5 |
|  | Preparation Example C2 | — | 1 | — | — | — |
|  | Preparation Example C3 | — | — | 1 | — | — |
| Crosslinking agent | Preparation Example C4 | — | — | — | 0.2 | 0.2 |
| Catalyst | Preparation Example C5 | — | — | — | 0.1 | 0.1 |
| Non-fluorinated acrylic polymer dispersion liquid | Preparation Example D1 | — | — | — | — | — |
| Alkylpolysiloxane dispersion liquid | Preparation Example E1 | — | — | — | — | — |
| Antistatic agent | NICEPOLE FE-26 | 0.5 | 0.5 | 0.5 | 0.5 | 0.5 |
| Penetrating agent | TEXPORT BG-290 | 0.5 | 0.5 | 0.5 | 0.5 | 0.5 |
| Water |  | 94 | 94 | 94 | 94.7 | 94.2 |
| Amino-modified silicone:alkylpolysiloxane |  | 100:925 | 100:925 | 100:925 | 100:925 | 100:925 |
| Water repellency (polyester) | Washing 0 times (L-0) | 4-5 | 4-5 | 4-5 | 4-5 | 4-5 |
| Durable water repelleng (polyester) | Washing 10 times (L-10) | 4 | 4 | 3 | 4 | 4 |
| Water repellency (nylon) | Washing 0 times (L-0) | 4-5 | 4-5 | 4-5 | 4-5 | 4-5 |
| Durable water repellency (nylon) | Washing 10 times (L-10) | 4 | 3 | 4 | 4 | 3 |
| Texture (polyester) |  | 5 | 5 | 5 | 5 | 5 |
| Seam slippage property (nylon) (mm) |  | 1.7 | 1.7 | 1.7 | 1.8 | 1.8 |

TABLE 6

|  |  | Example 21 | Example 22 |
|---|---|---|---|
| Amino-modified silicone dispersion liquid | Preparation Example A8 | 0.3 | 0.3 |
| Dispersion liquid of alkylpolysiloxane and silicone resin | Preparation Example B1 | — | — |
|  | Preparation Example B2 | — | — |
|  | Preparation Example B3 | — | — |
|  | Preparation Example B4 | 3.7 | 3.7 |
| (Amino-modified silicone + silicone resin + alkylpolysiloxane) dispersion liquid |  | — | — |
| Polyfunctional isocyanate compound dispersion liquid | Preparation Example C1 | — | — |
|  | Preparation Example C2 | — | — |
|  | Preparation Example C3 | — | — |
| Crosslinking agent | Preparation Example C4 | — | — |
| Catalyst | Preparation Example C5 | — | — |
| Non-fluorinated acrylic polymer dispersion liquid | Preparation Example D1 | — | — |
| Alkylpolysiloxane dispersion liquid | Preparation Example E1 | — | — |
| Antistatic agent | NICEPOLE FE-26 | 0.5 | 0.5 |
| Penetrating agent | TEXPORT BG-290 | 0.5 | 0.5 |
| Water |  | 95 | 95 |
| Amino-modified silicone:alkylpolysiloxane |  | 100:925 | 100:925 |
| Water repellency (polyester) | Washing 0 times (L-0) | 3 | 4 |
| Durable water repellency (polyester) | Washing 10 times (L-10) | 2-3 | 4 |
| Water repellency (nylon) | Washing 0 times (L-0) | 4-5 | 4-5 |
| Durable water repellency (nylon) | Washing 10 times (L-10) | 3 | 3 |
| Texture (polyester) |  | 5 | 5 |
| Seam slippage property (nylon) (mm) |  | 1.8 | 1.8 |

TABLE 7

|  |  | Comparative Example 1 | Comparative Example 2 | Comparative Example 3 | Comparative Example 4 | Comparative Example 5 | Comparative Example 6 |
|---|---|---|---|---|---|---|---|
| Amino-modified silicone dispersion liquid | Preparation Example A1 | — | — | — | — | — | — |
|  | Preparation Example A2 | — | — | — | — | — | — |
|  | Preparation Example A3 | — | — | — | — | — | — |
|  | Preparation Example A4 | 4 | — | — | 4 | — | — |
|  | Preparation Example A5 | — | — | — | — | — | — |
|  | Preparation Example A6 | — | — | — | — | — | — |
|  | Preparation Example A7 | — | — | — | — | — | — |
| Dispersion liquid of alkylpolysiloxane and silicone resin | Preparation Example B1 | — | — | 4 | — | — | 4 |
|  | Preparation Example B2 | — | — | — | — | — | — |
|  | Preparation Example B3 | — | — | — | — | — | — |
|  | Preparation Example B4 | — | — | — | — | — | — |
| (Amino-modified silicone + silicone resin + alkylpolysiloxane) dispersion liquid |  | — | — | — | — | — | — |
| Polyfunctional isocyanate compound dispersion liquid | Preparation Example C1 | 1 | 1 | 1 | — | — | — |
|  | Preparation Example C2 | — | — | — | — | — | — |
|  | Preparation Example C3 | — | — | — | — | — | — |
| Crosslinking agent | Preparation Example C4 | — | — | — | — | — | — |
| Catalyst | Preparation Example C5 | — | — | — | — | — | — |
| Non-fluorinated acrylic polymer dispersion liquid | Preparation Example D1 | — | 6 | — | — | 6 | — |
| Alkylpolysiloxane dispersion liquid | Preparation Example E1 | — | — | — | — | — | — |
| Antistatic agent | NICEPOLE FE-26 | 0.5 | 0.5 | 0.5 | 0.5 | 0.5 | 0.5 |
| Penetrating agent | TEXPORT BG-290 | 0.5 | 0.5 | 0.5 | 0.5 | 0.5 | 0.5 |
| Water |  | 94 | 92 | 94 | 95 | 93 | 95 |
| Amino-modified silicone:alkylpolysiloxane |  | 100:0 | 0:0 | 0:100 | 100:0 | 0:0 | 0:100 |
| Water repellency (polyester) | Washing 0 times (L-0) | 2 | 4 | 1 | 1 | 4 | 1 |
| Durable water repellency (polyester) | Washing 10 times (L-10) | 1 | 2 | 1 | 1 | 1 | 1 |
| Water repellency (nylon) | Washing 0 times (L-0) | 2 | 4 | 1 | 1 | 4 | 1 |
| Durable water repellency (nylon) | Washing 10 times (L-10) | 1 | 1 | 1 | 1 | 1 | 1 |
| Texture (polyester) |  | 5 | 2 | 2 | 5 | 2 | 2 |
| Seam slippage property (nylon) (mm) |  | 11.8 | 8.4 | 2 | 12.1 | 8.8 | 2 |

TABLE 8

|  |  | Comparative Example 7 | Comparative Example 8 | Comparative Example 9 | Comparative Example 10 |
|---|---|---|---|---|---|
| Amino-modified silicone dispersion liquid | Preparation Example A1 | — | — | — | — |
|  | Preparation Example A2 | — | — | — | — |
|  | Preparation Example A3 | — | — | — | — |
|  | Preparation Example A4 | 0.4 | 0.015 | 0.4 | 0.01 |
|  | Preparation Example A5 | — | — | — | — |
|  | Preparation Example A6 | — | — | — | — |
|  | Preparation Example A7 | — | — | — | — |
| Dispersion liquid of alkylpolysiloxane and silicone resin | Preparation Example B1 | — | — | 3.6 | 3.99 |
|  | Preparation Example B2 | — | — | — | — |
|  | Preparation Example B3 | — | — | — | — |
|  | Preparation Example B4 | — | — | — | — |
| (Amino-modified silicone + silicone resin + alkylpolysiloxane) dispersion liquid |  | — | — | — | — |
| Polyfunctional isocyanate compound dispersion liquid | Preparation Example C1 | — | — | — | — |
|  | Preparation Example C2 | — | — | — | — |
|  | Preparation Example C3 | — | — | — | — |
| Crosslinking agent | Preparation Example C4 | — | — | — | — |
| Catalyst | Preparation Example C5 | — | — | — | — |
| Non-fluorinated acrylic polymer dispersion liquid | Preparation Example D1 | — | — | — | — |
| Alkylpolysiloxane dispersion liquid | Preparation Example E1 | 1.8 | 1.9925 | — | — |
| Antistatic agent | NICEPOLE FE-26 | 0.5 | 0.5 | 0.5 | 0.5 |
| Penetrating agent | TEXPORT BG-290 | 0.5 | 0.5 | 0.5 | 0.5 |
| Water |  | 96.8 | 96.9925 | 95 | 95 |
| Amino-modified silicone:akylpolysiloxane |  | 100:450 | 100:13283 | 100:450 | 100:19950 |
| Water repellency (polyester) | Washing 0 times (L-0) | 1 | 1 | 3 | 2 |
| Durable water repellency (polyester) | Washing 10 times (L-10) | 1 | 1 | 2 | 1 |
| Water repellency (nylon) | Washing 0 times (L-0) | 1 | 1 | 3 | 2 |
| Durable water repellency (nylon) | Washing 10 times (L-10) | 1 | 1 | 2 | 1 |
| Texture (polyester) |  | 4 | 4 | 5 | 1 |
| Seam slippage property (nylon) (mm) |  | 5.6 | 5.1 | 2.6 | 2.00 |

It was confirmed that the water-repellent textile products of Examples 1 to 22 treated with the water repellent agent composition are excellent in water repellency, durable water repellency, and texture, and also are excellent in seam slippage property.

INDUSTRIAL APPLICABILITY

According to the present invention, it is possible to provide a water repellent agent composition by which a water-repellent textile product excellent in water repellency, durable water repellency, and texture can be obtained. Furthermore, according to the water repellent agent composition of the present invention, excellent seam slippage property can be imparted to a textile product or the like.

The invention claimed is:

1. A method for producing a water-repellent textile product, the method comprising attaching a water repellent agent to textile fibers by a step of treating the fibers with a treatment liquid consisting of a water repellent agent composition consisting of aminomodified silicone, a silicone resin, alkylpolysiloxane, and water, and optionally one or more of the following:
fluorine-based polymers, aliphatic hydrocarbon, aliphatic carboxylic acid, aliphatic carboxylic acid esters, polyolefin, poly(meth)acrylic acid ester,
polymerization initiator, chain transfer agent,
polymerization inhibitor,
polyfunctional isocyanate compound, a surfactant, an antifoaming agent, an organic acid, an inorganic acid, ethanol, isopropanol, glycerin, trimethylol propane, diethylene glycol, triethylene glycol, dipropylene glycol, propylene glycol, an antibacterial agent, an antifungal agent, a pH adjuster, a colorant, silica, an antioxidant, a refresher, catalysts, an emulsion stabilizer, organic solvents other than alkylpolysiloxane, a chelating agent, an antistatic agent, organomodified silicone other than amino-modified silicone,
and
penetrating agent;
wherein,
after the water repellent agent is attached to the fibers, the fibers are heat-treated at 110° C. to 180° C.,
the silicone resin consisting of MQ, MDQ, MTQ, or MDTQ as a constituent, where M has a formula $(R'')_3SiO_{0.5}$, D has a formula $(R'')_2SiO$, T has a formula $R''SiO_{1.5}$, and Q is $SiO_2$,
and R'' is a monovalent aliphatic hydrocarbon group having 1 to 10 carbon atoms or a monovalent aromatic hydrocarbon group having 6 to 15 carbon atoms, and
the alkylpolysiloxane is present in the water repellent agent composition in 925 to 6,000 parts by mass with respect to 100 parts by mass of an amount of the aminomodified silicone in the water repellent agent composition.

2. The method for producing a water-repellent textile product according to claim 1, wherein the fibers are at least one selected from the group consisting of fibers of side fabric for down, coats, blousons, windbreakers, blouses, dress shirts, skirts, slacks, gloves, hats, mattress sheets, mattress covers, curtains, and tents.

3. A method for producing a water-repellent textile product, the method comprising a step of treating fibers with a treatment liquid consisting of a water repellent agent composition consisting of aminomodified silicone, a silicone resin, alkylpolysiloxane, and water, and optionally one or more of the following:
fluorine-based polymers, aliphatic hydrocarbon, aliphatic carboxylic acid, aliphatic carboxylic acid esters, polyolefin, poly(meth)acrylic acid ester, polymerization initiator, chain transfer agent, polymerization inhibitor, polyfunctional isocyanate compound, a surfactant, an antifoaming agent, an organic acid, an inorganic acid, ethanol, isopropanol, glycerin, trimethylol propane, diethylene glycol, triethylene glycol, dipropylene glycol, propylene glycol, an antibacterial agent, an antifungal agent, a pH adjuster, a colorant, silica, an antioxidant, a refresher, catalysts, an emulsion stabilizer, organic solvents other than alkylpolysiloxane, a chelating agent, an antistatic agent, organomodified silicone other than amino-modified silicone, and penetrating agent;

wherein, after treating the fibers with the treatment liquid, the fibers are heat-treated at 110° C. to 180° C., the silicone resin consisting of MQ, MDQ, MTQ, or MDTQ as a constituent, where M has a formula $(R'')_3 SiO_{0.5}$, D has a formula $(R'')_2 SiO$, T has a formula $R''SiO_{1.5}$, and Q is $SiO_2$, and R'' is a monovalent aliphatic hydrocarbon group having 1 to 10 carbon atoms or a monovalent aromatic hydrocarbon group having 6 to 15 carbon atoms, a functional group equivalent of the aminomodified silicone is 100 to 20,000 g/mol, and the alkylpolysiloxane is present in the water repellent agent composition in 925 to 6,000 parts by mass with respect to 100 parts by mass of an amount of the aminomodified silicone in the water repellent agent composition.

* * * * *